United States Patent
Shibata et al.

(10) Patent No.: US 9,843,232 B2
(45) Date of Patent: Dec. 12, 2017

(54) ROTARY ELECTRIC MACHINE

(71) Applicant: HONDA MOTOR CO., LTD., Tokyo (JP)

(72) Inventors: Takumi Shibata, Wako (JP); Yoshihisa Matsuoka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 513 days.

(21) Appl. No.: 14/297,554

(22) Filed: Jun. 5, 2014

(65) Prior Publication Data
US 2015/0022047 A1 Jan. 22, 2015

(30) Foreign Application Priority Data

Jul. 18, 2013 (JP) ................................. 2013-149940

(51) Int. Cl.
*H02K 3/28* (2006.01)

(52) U.S. Cl.
CPC ...................................... *H02K 3/28* (2013.01)

(58) Field of Classification Search
CPC ............... H02K 3/12; H02K 3/14; H02K 3/28
See application file for complete search history.

(56) References Cited

U.S. PATENT DOCUMENTS

| | | | |
|---|---|---|---|
| 2012/0019081 A1* | 1/2012 | Tamura | H02K 3/12 310/43 |
| 2014/0033514 A1* | 2/2014 | Chamberlin | H02K 15/0006 29/596 |
| 2014/0210286 A1* | 7/2014 | Guercioni | H02K 3/28 310/71 |

FOREIGN PATENT DOCUMENTS

| | | | |
|---|---|---|---|
| CN | 102340193 | 2/2012 | |
| IT | WO 2013005238 A1 * | 1/2013 | ............... H02K 3/12 |
| JP | 2012-029370 | 2/2012 | |
| JP | 2013-063007 | 4/2013 | |
| WO | WO 2013/005238 | 1/2013 | |

OTHER PUBLICATIONS

Chinese Office Action for corresponding CN Application No. 201410235378.X, dated Feb. 20, 2017 (w/ English machine translation).

* cited by examiner

*Primary Examiner* — Quyen Leung
*Assistant Examiner* — Eric Johnson
(74) *Attorney, Agent, or Firm* — Mori & Ward, LLP

(57) ABSTRACT

A rotary electric machine includes a three-phase coil including a first phase coil, a second phase coil, and a third phase coil for magnetic flux generation. A bridge conductor connecting an ath end and a bth end of the first phase coil, and a bridge conductor connecting the ath end and the bth end of the third phase coil are provided in a protruding shape on one side of a stator in a radial direction when viewed in a axial direction of the stator. A bridge conductor connecting the ath end and the bth end of the second phase coil is provided in a protruding shape on the other side of the stator in the radial direction when viewed in the axial direction of the stator. The bridge conductor of each coil in the three-phase coil is arranged at the same height position in the axial direction.

14 Claims, 10 Drawing Sheets

FIG. 3

| Slot # | 71 | 72 | 1 | 2 | 3 | 4 | 5 | 6 | 7 | 8 | 9 | 10 | 11 | 12 |
|---|---|---|---|---|---|---|---|---|---|---|---|---|---|---|
| (8) | 17u | 17u | 80w | 80w | 17v | 17v | 76u | 76u | 17w | 17w | 76v | 76v | 21u | 21u |
| (7) | 77u | 77u | 16w | 16w | 77v | 77v | 20u | 20u | 77w | 77w | 20v | 20v | 73u | 73u |
| (6) | 41u | 41u | 56w | 56w | 41v | 41v | 52u | 52u | 41w | 41w | 52v | 52v | 45u | 45u |
| (5) | 53u | 53u | 40w | 40w | 53v | 53v | 44u | 44u | 53w | 53w | 44v | 44v | 49u | 49u |
| (4) | 79u | 14w | 14w | 79v | 79v | 18u | 18u | 79w | 79w | 18v | 18v | 75u | 75u | 18w |
| (3) | 15u | 82w | 82w | 15v | 15v | 78u | 78u | 15w | 15w | 78v | 78v | 19u | 19u | 78w |
| (2) | 55u | 38w | 38w | 55v | 55v | 42u | 42u | 55w | 55w | 42v | 42v | 51u | 51u | 42w |
| (1) | 39u | 58w | 58w | 39v | 39v | 54u | 54u | 39w | 39w | 54v | 54v | 43u | 43u | 54w |

| Slot # | 13 | 14 | 15 | 16 | 17 | 18 | 19 | 20 | 21 | 22 | 23 | 24 | 25 | 26 |
|---|---|---|---|---|---|---|---|---|---|---|---|---|---|---|
| (8) | 76w | 76w | 21v | 21v | 96u | 96u | 21w | 21w | 96v | 96v | 1u | 1u | 96w | 96w |
| (7) | 20w | 20w | 73v | 73v | 24u | 24u | 73w | 73w | 24v | 24v | 93u | 93u | 24w | 24w |
| (6) | 52w | 52w | 45v | 45v | 72u | 72u | 45w | 45w | 72v | 72v | 25u | 25u | 72w | 72w |
| (5) | 44w | 44w | 49v | 49v | 48u | 48u | 49w | 49w | 48v | 48v | 69u | 69u | 48w | 48w |
| (4) | 18w | 75v | 75v | 22u | 22u | 75w | 75w | 22v | 22v | 95u | 95u | 22w | 22w | 95v |
| (3) | 78w | 19v | 19v | 74u | 74u | 19w | 19w | 74v | 74v | 23u | 23u | 74w | 74w | 23v |
| (2) | 42w | 51v | 51v | 46u | 46u | 51w | 51w | 46v | 46v | 71u | 71u | 46w | 46w | 71v |
| (1) | 54w | 43v | 43v | 50u | 50u | 43w | 43w | 50v | 50v | 47u | 47u | 50w | 50w | 47v |

| Slot # | 27 | 28 | 29 | 30 | 31 | 32 | 33 | 34 | 35 | 36 | 37 | 38 | 39 | 40 |
|---|---|---|---|---|---|---|---|---|---|---|---|---|---|---|
| (8) | 1v | 1v | 92u | 92u | 1w | 1w | 92v | 92v | 5u | 5u | 92w | 92w | 5v | 5v |
| (7) | 93v | 93v | 4u | 4u | 93w | 93w | 4v | 4v | 89u | 89u | 4w | 4w | 89v | 89v |
| (6) | 25v | 25v | 68u | 68u | 25w | 25w | 68v | 68v | 29u | 29u | 68w | 68w | 29v | 29v |
| (5) | 69v | 69v | 28u | 28u | 69w | 69w | 28v | 28v | 65u | 65u | 28w | 28w | 65v | 65v |
| (4) | 95v | 2u | 2u | 95w | 95w | 2v | 2v | 91u | 91u | 2w | 2w | 91v | 91v | 6u |
| (3) | 23v | 94u | 94u | 23w | 23w | 94v | 94v | 3u | 3u | 94w | 94w | 3v | 3v | 90u |
| (2) | 71v | 26u | 26u | 71w | 71w | 26v | 26v | 67u | 67u | 26w | 26w | 67v | 67v | 30u |
| (1) | 47v | 70u | 70u | 47w | 47w | 70v | 70v | 27u | 27u | 70w | 70w | 27v | 27v | 66u |

ROTARY ELECTRIC MACHINE

CROSS-REFERENCE TO RELATED APPLICATIONS

The present application claims priority under 35 U.S.C. §119 to Japanese Patent Application No. 2013-149940, filed Jul. 18, 2013, entitled "Rotary Electric Machine." The contents of this application are incorporated herein by reference in their entirety.

BACKGROUND

1. Field

The present disclosure relates to a rotary electric machine.

2. Description of the Related Art

In known conventional rotary electric machines, phase coils for magnetic flux generation to be mounted on a stator have a configuration as disclosed in Japanese Unexamined Patent Application Publication (JP-A) No. 2012-29370 and No. 2013-63007. The phase coils in the rotary electric machines have a structure in which a plurality of element conductors, which are inserted in slots formed in the stator, are connected in series.

SUMMARY

According to one aspect of the present invention, a rotary electric machine includes a three-phase coil consisting of a first phase coil, a second phase coil, and a third phase coil for magnetic flux generation. Each coil in the three-phase coil is formed by connecting a plurality of element conductors in series. The element conductors are inserted in slots and extend in an axial direction of a stator. The slots are formed in the stator and arranged in a circumferential direction of the stator. A bridge conductor is arranged on one end side of the stator in the axial direction for each phase. The bridge conductor connects ends of specific Ath element conductor and Bth element conductor out of the element conductors that form each coil in the three-phase coil. The ends are on the one end side of the stator in the axial direction. An ath end and a bth end of each of the first phase, second phase, and third phase coils are arranged in the circumferential direction of the stator in an order. The ath end and the bth end are defined as the ends of the Ath element conductor and the Bth element conductor, respectively, of each coil in the three-phase coil on the one end side of the stator in the axial direction. The order is of the ath end of the first phase coil, the ath end of the second phase coil, the bth end of the first phase coil, the ath end of the third phase coil, the bth end of the second phase coil, and the bth end of the third phase coil. A bridge conductor connecting the ath end and the bth end of the first phase coil, and a bridge conductor connecting the ath end and the bth end of the third phase coil are formed in a protruding shape on one side of the stator in a radial direction when viewed in the axial direction of the stator. A bridge conductor connecting the ath end and the bth end of the second phase coil is formed in a protruding shape on the other side of the stator in the radial direction when viewed in the axial direction of the stator. The bridge conductor of each coil in the three-phase coil is arranged at the same height position in the axial direction of the stator.

According to another aspect of the present invention, a rotary electric machine includes a three-phase coil including a first phase coil, a second phase coil, and a third phase coil for magnetic flux generation. Each coil in the three-phase coil includes a plurality of element conductors connected in series. The plurality of element conductors are inserted into slots and extend in an axial direction of a stator. The slots are provided in the stator and arranged in a circumferential direction of the stator. A bridge conductor is arranged on one end side of the stator in the axial direction for each phase. The bridge conductor connects ends of specific Ath element conductor and Bth element conductor out of the element conductors that provide each coil in the three-phase coil. The ends are on the one end side of the stator in the axial direction. An ath end and a bth end of each of the first phase, second phase, and third phase coils are arranged in the circumferential direction of the stator in an order. The ath end and the bth end are defined as the ends of the Ath element conductor and the Bth element conductor, respectively, of each coil in the three-phase coil on the one end side of the stator in the axial direction. The order is of the ath end of the first phase coil, the ath end of the second phase coil, the bth end of the first phase coil, the ath end of the third phase coil, the bth end of the second phase coil, and the bth end of the third phase coil. A bridge conductor connecting the ath end and the bth end of the first phase coil, and a bridge conductor connecting the ath end and the bth end of the third phase coil are provided in a protruding shape on one side of the stator in a radial direction when viewed in the axial direction of the stator. A bridge conductor connecting the ath end and the bth end of the second phase coil is provided in a protruding shape on the other side of the stator in the radial direction when viewed in the axial direction of the stator. The bridge conductor of each coil in the three-phase coil is arranged at the same height position in the axial direction of the stator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a diagram illustrating an arrangement of element conductors included in the coils of each phase in the embodiment.

DESCRIPTION OF THE EMBODIMENTS

Figure 1:
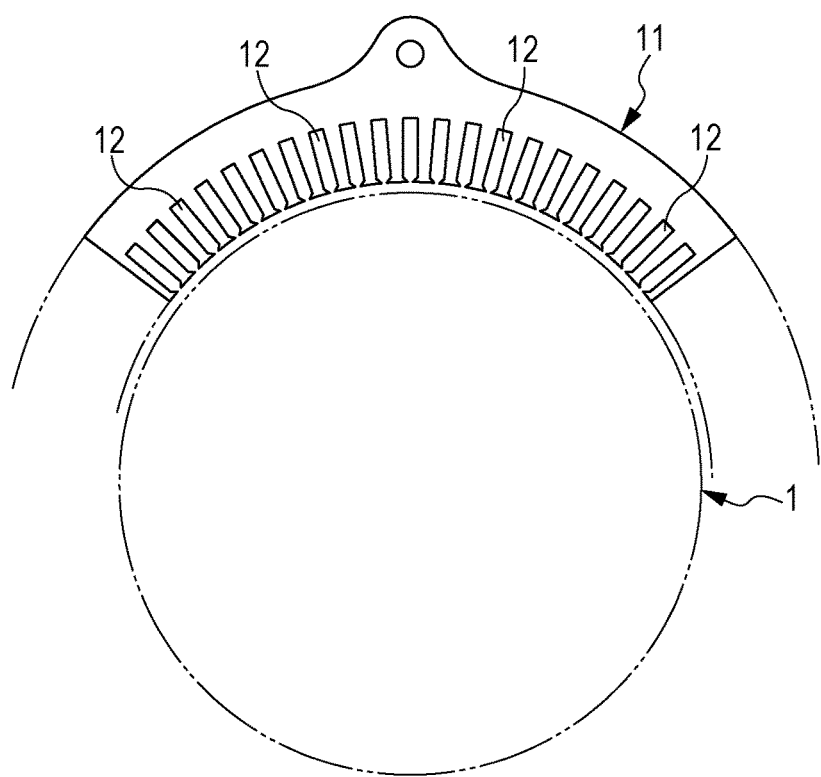
FIG. 1 is a diagram illustrating an arrangement of slots of a stator of a rotary electric machine according to an embodiment of the present disclosure.

The embodiments will now be described with reference to the accompanying drawings, wherein like reference numerals designate corresponding or identical elements throughout the various drawings.

An embodiment of the present disclosure will be described with reference to FIGS. 1 to 11.

A rotary electric machine in the present embodiment includes a substantially annular stator 11 which is arranged around the circumference of a rotor 1, and a coil 21 for magnetic flux generation which are mounted on the stator 11.

As illustrated in FIG. 1, a plurality of slots 12 are formed in the stator 11 so as to be arranged at regular pitches in the circumferential direction (the direction around the axial center of the stator 11) of the stator 11. Each of the slots 12 is provided so as to penetrate through the stator 11 in the axial direction.

Figure 2:
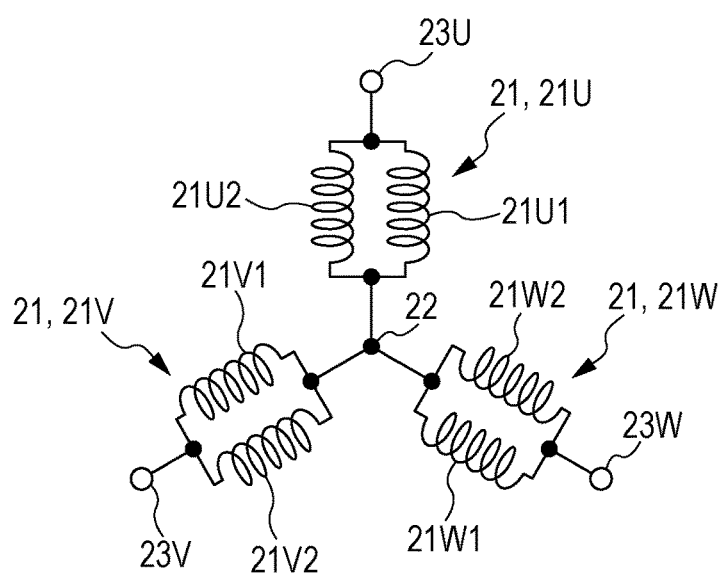
FIG. 2 is a circuit diagram illustrating an entire circuit configuration of the rotary electric machine according to the embodiment.

As illustrated in FIG. 2, the coil 21 includes three phase coils: U-phase coil 21U, V-phase coil 21V, and W-phase coil 21W. In the present embodiment, the coils 21U, 21V, and 21W of each phase respectively include two coils (21U1, 21U2), (21V1, 21V2), and (21W1, 21W2) which are connected in parallel. Respective one ends of the U-phase coil 21U, V-phase coil 21V, and W-phase coil 21W are connected with each other via a neutral point 22.

It should be noted that the U-phase coil 21U, V-phase coil 21V, and W-phase coil 21W correspond to the first phase coil, the second phase coil, and the third phase coil, respectively, in the present disclosure.

The other ends of the coils 21U, 21V, and 21W are respectively connected to current I/O terminals 23U, 23V, and 23W that serve as I/O portions that flow current to the coils 21U, 21V, and 21W, respectively.

In the following description, when it is not necessary to distinguish between the phase coils 21U, 21V, and 21W, any phase coil is denoted as coil 21X. In this notation, "X" indicates one of U, V, and W. The two coils included in a phase coil 21X are denoted as a first coil 21X1 and a second coil 21X2, and the current I/O terminal of the coil 21X is denoted as current I/O terminal 23X.

Figure 4:
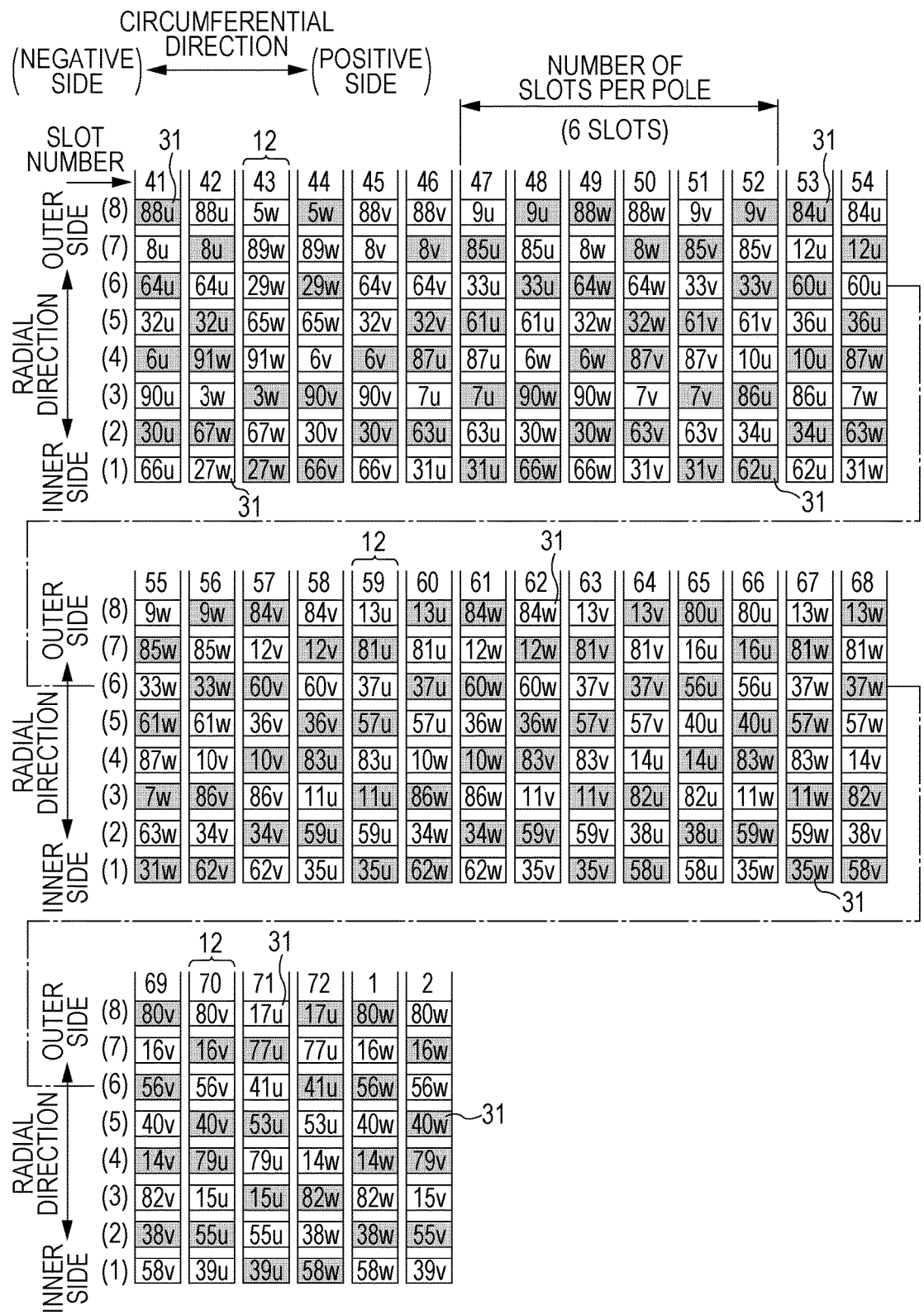
FIG. 4 is a diagram illustrating an arrangement of element conductors included in the coils of each phase in the embodiment.

As illustrated in FIGS. 3 and 4, each of the first coil 21X1 and the second coil 21X2 of any phase includes, as components, a predetermined number of linear element conductors 31 which are inserted in the slots 12. Each of the element conductors 31 extends in the axial direction of the stator 11 and is inserted in a slot 12 so as to penetrate through the slot 12.

Each of the first coil 21X1 and the second coil 21X2 of any phase is formed by connecting the above-mentioned predetermined number of linear element conductors 31 in series so as to allow electrical conduction sequentially (in other words, so as to form a continuous current path).

In FIGS. 3 and 4, it is assumed that the direction perpendicular to the paper surface is the axial direction of the stator 11, the horizontal direction is the circumferential direction of the stator 11, and the vertical direction is the radial direction of the stator 11, and each of the element conductors 31 is viewed in the axial direction of the stator 11. In the above, the element conductors 31 of the first coil 21X1 are each indicated as a white box and the element conductors 31 of the first coil 21X2 are each indicated as a gray box.

In FIGS. 3 and 4, the numbers in symbols (such as 17u, 80w) attached to the element conductors 31 of each of the first coil 21X1 and the second coil 21X2 of any phase indicate the order of connection (order of conduction) of the element conductors 31 from the current I/O terminal 23X to the neutral point 22. Also, u, v, or w in the symbols indicates which phase out of U phase, V phase, and W phase, each element conductor 31 belongs to.

It should be noted that the arrangement and the order of connection of the element conductors 31 indicated in FIGS. 3 and 4 are as viewed from one end side (below-described first end side) in the axial direction of the stator 11.

In the present embodiment, the number of pole pairs (the number of pairs of N pole and S pole) of the magnetic poles of the rotary electric machine is, for example, six pole pairs (totally 12 poles). As described above, the number of phases of the coil 21 is three, and the coil 21X of each phase includes the first coil 21X1 and the second coil 21X2 which are connected in parallel.

For this reason, in the present embodiment, the number of slots N per pole is given by N=3×2=6 pieces as illustrated in FIGS. 3 and 4. Thus, the total of 72 (=6×12) pieces of slots are formed in the stator 11. Also, eight element conductors 31 are inserted in each slot 12 so as to be aligned (aligned in eight layers) in a single row in the radial direction of the stator 11.

In the present embodiment, the first coil 21X1 and the second coil 21X2 of any phase each have 96 element conductors 31 (1st to 96th element conductors 31). Each of the first coil 21X1 and the second coil 21X2 of any phase is formed by connecting the 96 element conductors 31 inserted in the slots 12 in series so as to allow electrical conduction in the numerical order as illustrated in FIGS. 3 and 4.

Hereinafter, a more specific structure of the first coil 21X1 and the second coil 21X2 of any phase will be described in detail.

First, the first coil 21X1 of any phase will be described with reference to FIGS. 3 to 8. It should be noted that in the subsequent description, the arrangement positions in the radial direction of the stator 11 of eight element conductors 31 inserted in each slot 12 are referred to as a first layer, a second layer, . . . . . , an eighth layer from the inner side (radially inner side) to the outer side (radially outer side) in the radial direction of the stator 11.

Also, a predetermined direction out of two directions: a clockwise direction and a counterclockwise direction in the circumferential direction of the stator 11 is referred to as a positive circumferential direction and the opposite direction to the predetermined direction is referred to as a negative circumferential direction. In description of the present embodiment, for the sake of convenience, the positive circumferential direction is defined as the rightward direction in FIGS. 3 to 8 and the negative circumferential direction is defined as the leftward direction in FIGS. 3 to 8.

In the present embodiment, the first coil 21X1 of any phase is formed by connecting four partial coils in series, a first partial coils (hereinafter referred to as 1st to 24th partial coils) being formed by connecting 1st to 24th element conductors 31 in series, a second partial coils (hereinafter referred to as 25th to 48th partial coils) being formed by connecting 25th to 48th element conductors 31 in series, a third partial coils (hereinafter referred to as 49th to 72nd partial coils) being formed by connecting 49th to 72nd element conductors 31 in series, a fourth partial coils (hereinafter referred to as 73rd to 96th partial coils) being formed by connecting 73rd to 96th element conductors 31 in series.

The arrangement and connection configuration of the element conductors 31 of the first coil 21X1 are mainly divided into the configuration of the 1st to 24th partial coils, the configuration of the 25th to 48th partial coils, the configuration of the 49th to 72nd partial coils, and the configuration of the 73rd to 96th partial coils.

In addition, the element conductors 31 (24 element conductors 31) included in the above-mentioned each partial coils of the first coil 21X1 are divided into a first element conductor group and a second element conductor group, the first element conductor group including a plurality of element conductors which are respectively inserted in a plurality of slots 12 arranged in the circumferential direction of the stator 11 at a pitch of a first predetermined interval, the second element conductor group including the plurality of element conductors 31 which are respectively inserted in a plurality of slots 12 arranged in the circumferential direction of the stator 11 at the pitch of the first predetermined interval with a phase shifted in the circumferential direction of the stator 11 with respect to the slots 12 in which the element conductors 31 of the first element conductor group are inserted.

In this configuration, in each of the 1st to 24th partial coils, the 25th to 48th partial coils, the 49th to 72nd partial coils, and the 73rd to 96th partial coils of the first coil 21X1, the slots 12 in which the element conductors 31 (hereinafter may be referred to as second element conductors 31) of the second element conductor group are inserted, are shifted in phase in the positive circumferential direction of the stator 11 by a second predetermined interval with respect to the slots 12 in which the element conductors 31 (hereinafter may be referred to as first element conductors 31) of the first element conductor group are inserted, the second predetermined interval being smaller than the first predetermined interval.

In the present embodiment, the above-mentioned first element conductors 31 are each arranged in a layer (one of the 5th to 8th layers) on the radially outer side of the stator 11. Also, the above-mentioned second element conductors 31 are each arranged in a layer (one of the 1st to 4th layers) on the radially inner side of the stator 11.

Here, in the present description, the "interval" between any two slots 12, 12 in the circumferential direction of the stator 11, such as the above-mentioned first predetermined interval, second predetermined interval, corresponds to the difference between the angle positions (phases) of the slots 12, 12 around the axial center of the stator 11.

The above-mentioned first predetermined interval is the interval (=6×unit pitch) obtained by multiplying the unit pitch of the slots 12 (the interval between two adjacent slots 12, 12 in the circumferential direction of the stator 11) by the number of slots per pole (6 pieces in the present embodiment) of the rotary electric machine.

Hereinafter, k slot pitch refers to the interval which is k times the unit pitch of the slots 12. In the present embodiment, the first predetermined interval is 6 slot pitch.

Also, the second predetermined interval is set to be a smaller interval than the first predetermined interval. In the present embodiment, the second predetermined interval is set to be 5 times the unit pitch of the slots 12, that is, 5 slot pitch.

The arrangement and connection configuration of the element conductors 31 in each of the 1st to 24th partial coils, the 25th to 48th partial coils, the 49th to 72nd partial coils, and the 73rd to 96th partial coils of the first coil 21X1 of any phase will be further specifically described.

Figure 5A:
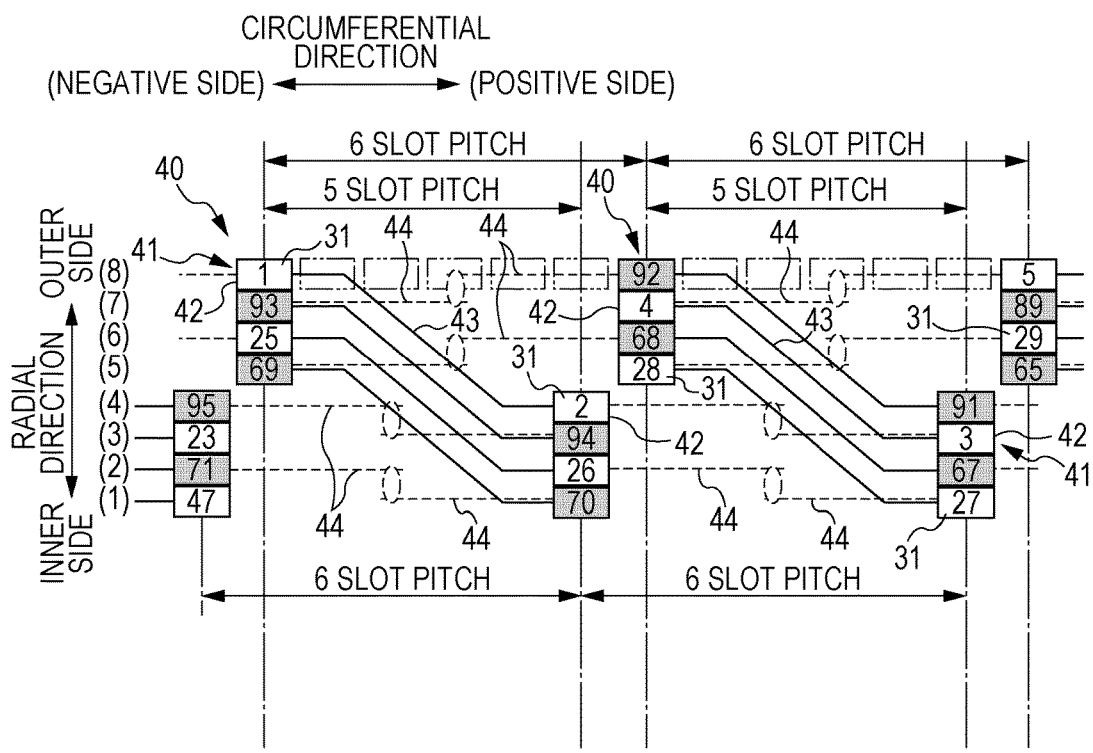
FIGS. 5A and 5B are each a diagram illustrating an arrangement and connection configuration of part of the element conductors included in the coils of each phase in the embodiment.

First, the 1st to 24th element conductors 31 included in the 1st to 24th partial coils of the first coil 21X1 are arranged in the following manner. As illustrated in FIGS. 3 and 4 or FIG. 5A, the $(4n+1)$th ($n=0, 1, \ldots, 5$) element conductor 31 is located in the 8th layer in a corresponding slot 12. The subsequent $(4n+2)$th element conductor 31 is located in the 4th layer (the layer arranged radially inward by 4 layers from the $(4n+1)$th element conductor 31) in the slot 12 which is spaced away by the second predetermined interval (interval of 5 slot pitch) in the positive circumferential direction from the slot 12 in which the $(4n+1)$th element conductor 31 is arranged. The subsequent $(4n+3)$th element conductor 31 is located in the 3rd layer (the layer arranged radially inward by 1 layer from the $(4n+2)$th element conductor 31) in the slot 12 which is spaced away by the first predetermined interval (interval of 6 slot pitch) in the positive circumferential direction from the slot 12 in which the $(4n+2)$th element conductor 31 is arranged. The subsequent $(4n+4)$th element conductor 31 is located in the 7th layer (the layer arranged radially outward by 4 layers from the $(4n+3)$th element conductor 31) in the slot 12 which is spaced away by the second predetermined interval (interval of 5 slot pitch) in the negative circumferential direction from the slot 12 in which the $(4n+3)$th element conductor 31 is arranged.

In FIG. 5A, the 1st to 5th element conductors 31 are illustrated as one example of $(4n+1)$th, $(4n+2)$th, $(4n+3)$th, $(4n+4)$th, $(4(n+1)+1)$th element conductors 31 (where $n=0$).

In this example, due to the above-described arrangement of the $(4n+1)$th to $(4n+4)$th element conductors 31, the slot 12, in which the $(4n+4)$th element conductor 31 is arranged, is spaced away by an interval of 1 slot pitch (interval of the difference between the first predetermined interval and the second predetermined interval) in the positive circumferential direction from the slot 12 in which the $(4n+2)$th element conductor 31 is arranged, and is spaced away by the first predetermined interval (interval of 6 slot pitch) in the positive circumferential direction from the slot 12 in which the $(4n+1)$th element conductor 31 is arranged.

Here, the $(4n+1)$th and $(4n+4)$th element conductors 31 are the element conductors (the first element conductors) of the first element conductor group, and the $(4n+2)$th and $(4n+3)$th element conductors 31 are the element conductors (the second element conductors) of the second element conductor group. Consequently, in the 1st to 24th partial coils, each of the first element conductors 31 is arranged in the 7th layer or the 8th layer, and each of the second element conductors 31 is arranged in the 3rd layer or the 4th layer.

In the 1st to 24th element conductors 31, pairs of element conductors 31, 31 (specifically, the pair of the $(4n+1)$th and $(4n+2)$th element conductors 31, 31 and the pair of the $(4n+3)$th and $(4n+4)$th element conductors 31, 31) having the second predetermined interval (interval of 5 slot pitch) in the circumferential direction of the stator 11 and a predetermined interval (interval of 4 layers) in the radial direction of the stator 11 are each connected via a first crossover portion 43 (which will be described below in detail) on one end side in the axial direction (hereinafter referred to as a first end side in the axial direction) of the stator 11 as a pair of a first element conductor 31 and a second element conductor 31 to be connected (see FIG. 5A).

Also, pairs of element conductors 31, 31 (specifically, the pair of the (4n+2)th and (4n+3)th element conductors 31, 31 and the pair of the (4n'+4)th and (4(n'+1)+1)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via a second crossover portion 44 (which will be described below in detail) on the other end side in the axial direction (hereinafter referred to as a second end side in the axial direction) of the stator 11 as a pair of two first element conductors 31, 31 or a pair of two second element conductors 31, 31 to be connected (see FIG. 5A).

In FIG. 5A, for convenience of illustration, the first crossover portion 43 is indicated by a solid line and the second crossover portion 44 is indicated by a dashed line.

Figure 5B:
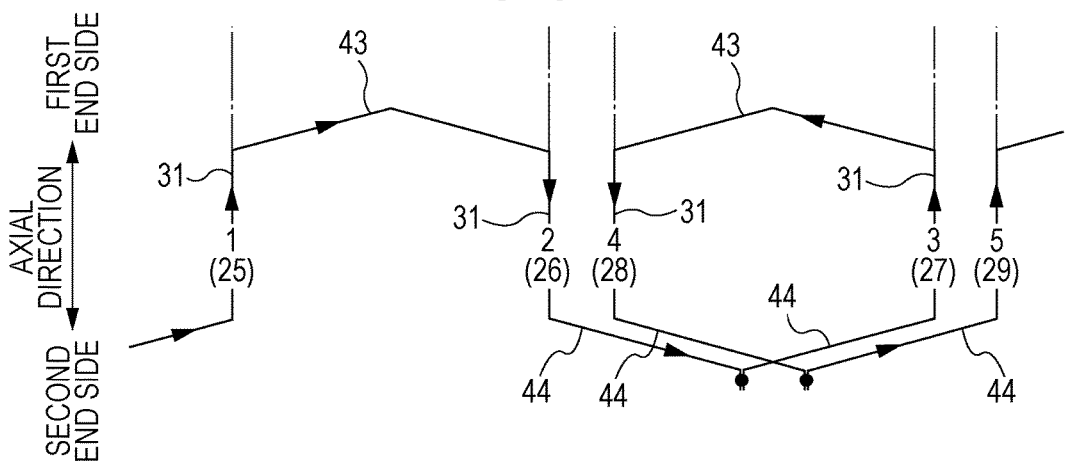

In this manner, the element conductors 31 included in the 1st to 24th partial coils are connected in series so as to allow electrical conduction sequentially in the pattern as illustrated in FIG. 5B. Thus, the 1st to 24th partial coils are formed. In this formation, when the set of the 1st to 4th element conductors 31, 31, 31, 31 connected in series in the above-described manner is defined as one element conductor group, the 1st to 24th partial coils are formed by continuously connecting 6 sets of the element conductor group at an interval of 12 slot pitch (2×the first predetermined interval) in the positive circumferential direction of the stator 11.

As supplemental remarks, in the present embodiment, the second end side of the stator 11 in the axial direction corresponds to the other end side in the axial direction of the stator in the present disclosure.

Next, the 25th to 48th element conductors 31 included in the 25th to 48th partial coils of the first coil 21X1 are arranged in the following manner. As illustrated in FIGS. 3 and 4 or FIG. 5A, the (4n+25)th (n=0, 1, . . . , 5) element conductor 31 is located in the 6th layer in a corresponding slot 12. The subsequent (4n+26)th element conductor 31 is located in the 2nd layer (the layer arranged radially inward by 4 layers from the (4n+25)th element conductor 31) in the slot 12 which is spaced away by the second predetermined interval (interval of 5 slot pitch) in the positive circumferential direction from the slot 12 in which the (4n+25)th element conductor 31 is arranged. The subsequent (4n+27)th element conductor 31 is located in the 1st layer (the layer arranged radially inward by 1 layer from the (4n+26)th element conductor 31) in the slot 12 which is spaced away by the first predetermined interval (interval of 6 slot pitch) in the positive circumferential direction from the slot 12 in which the (4n+26)th element conductor 31 is arranged. The subsequent (4n+28)th element conductor 31 is located in the 5th layer (the layer arranged radially outward by 4 layers from the (4n+27)th element conductor 31) in the slot 12 which is spaced away by the second predetermined interval (interval of 5 slot pitch) in the negative circumferential direction from the slot 12 in which the (4n+27)th element conductor 31 is arranged.

In FIG. 5A, the 25th to 29th element conductors 31 are illustrated as one example of (4n+25)th, (4n+26)th, (4n+27)th, (4n+28)th, (4(n+1)+25)th element conductors 31 (where n=0).

In this example, the slots 12 in which the (4n+25)th to (4n+28)th element conductors 31 are respectively arranged are the same as the slots 12 in which the (4n+1)th, (4n+2)th, (4n+3)th, (4n+4)th element conductors 31 are respectively arranged.

The (4n+25)th and (4n+28)th element conductors 31 are the element conductors (the first element conductors) of the first element conductor group, and the (4n+26)th and (4n+27)th element conductors 31 are the element conductors (the second element conductors) of the second element conductor group. Consequently, in the 25th to 48th partial coils, each of the first element conductors 31 is arranged in the 5th layer or the 6th layer, and each of the second element conductors 31 is arranged in the 1st layer or the 2nd layer.

Therefore, the arrangement of the element conductors 31 in the 25th to 48th partial coils are obtained by shifting the entire arrangement of the element conductors 31 in the 1st to 24th partial coils radially inward of the stator 11 by 2 layers.

Similarly to the case of the 1st to 24th partial coils, in the 25th to 48th element conductors 31, pairs of element conductors 31, 31 (specifically, the pair of the (4n+25)th and (4n+26)th element conductors 31, 31 and the pair of the (4n+27)th and (4n+28)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 5A).

Also, pairs of element conductors 31, 31 (specifically, the pair of the (4n+26)th and (4n+27)th element conductors 31, 31 and the pair of the (4n'+28)th and (4n'+29)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 5B).

In this manner, the element conductors 31 included in the 25th to 48th partial coils are connected in series so as to allow electrical conduction sequentially in the same pattern as the case of the 1st to 24th partial coils illustrated in FIG. 5B. Thus, the 25th to 48th partial coils are formed.

In this formation, when the set of the 25th to 28th element conductors 31, 31, 31, 31 connected in series in the above-described manner is defined as one element conductor group, the 25th to 48th partial coils are formed by continuously connecting 6 sets of the element conductor group at an interval of 12 slot pitch (2×the first predetermined interval) in the positive circumferential direction of the stator 11.

Figure 7A:
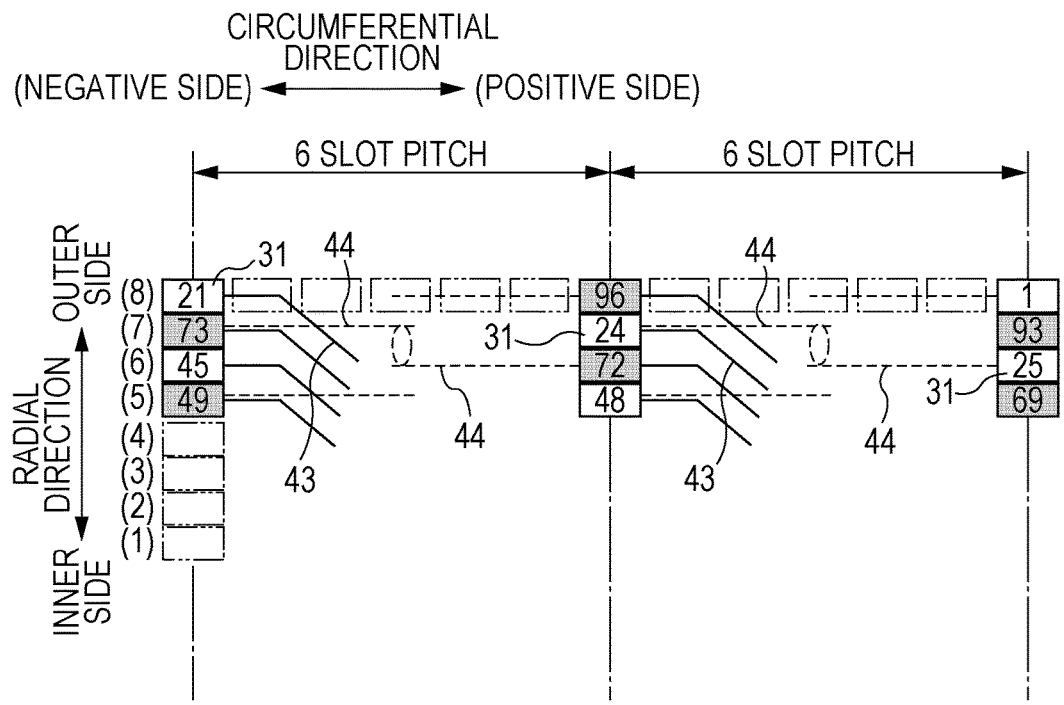
FIGS. 7A and 7B are each a diagram illustrating an arrangement and connection configuration of part of the element conductors included in the coils of each phase in the embodiment.

It should be noted that as illustrated in FIG. 7A, the 24th element conductor 31 in the 1st to 24th partial coils and the 25th element conductor 31 in the 25th to 48th partial coils are arranged in the slots 12, 12 having the first predetermined interval (interval of 6 slot pitch) in the circumferential direction of the stator 11 and being in adjacent layers (the 7th layer, the 6th layer) in the radial direction of the stator 11. The element conductors 31, 31 are connected via the second crossover portion 44 on the second end side in the axial direction of the stator 11. Consequently, the 25th to 48th partial coils are connected to the 1st to 24th partial coils in series.

Figure 6A:
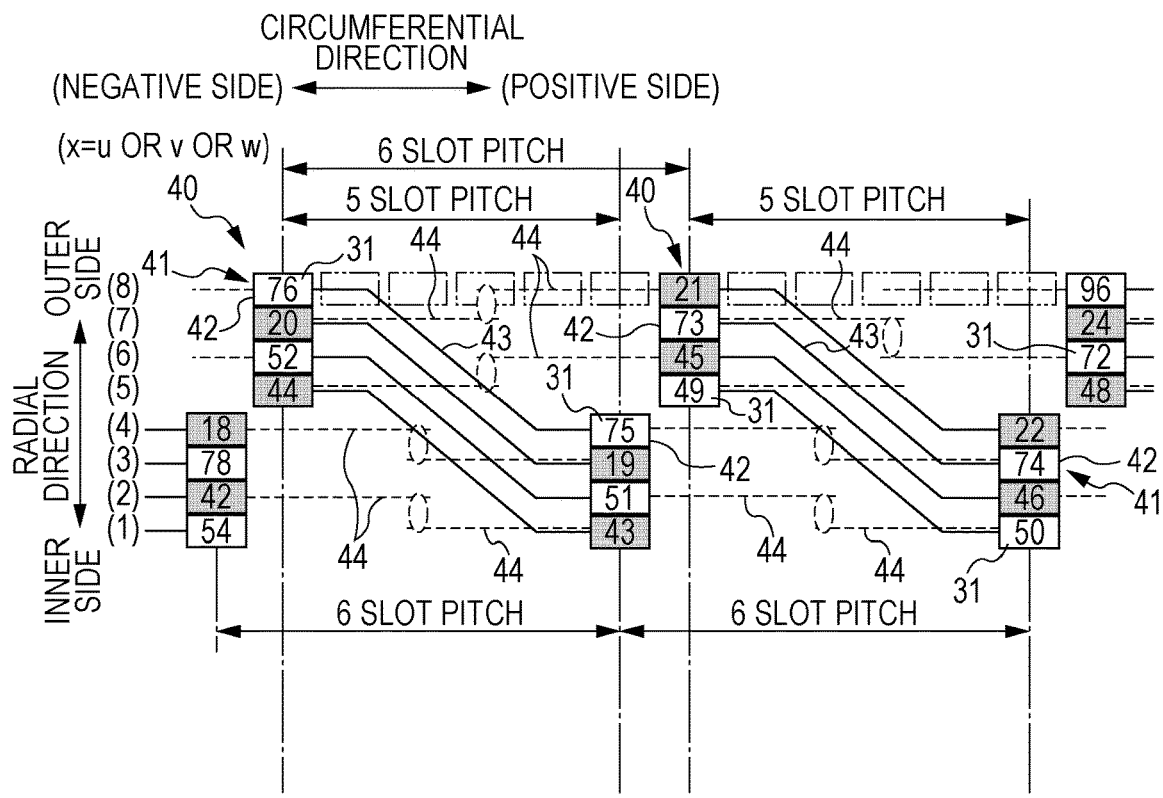
FIGS. 6A and 6B are each a diagram illustrating an arrangement and connection configuration of part of the element conductors included in the coils of each phase in the embodiment.

Next, the 49th to 72nd element conductors 31 included in the 49th to 72nd partial coils of the first coil 21X1 are arranged in the following manner. As illustrated in FIGS. 3 and 4 or FIG. 6A, the (4n+49)th (n=0, 1, . . . , 5) element conductor 31 is located in the 5th layer in a corresponding slot 12. The subsequent (4n+50)th element conductor 31 is located in the 1st layer (the layer arranged radially inward by 4 layers from the (4n+49)th element conductor 31) in the slot 12 which is spaced away by the second predetermined interval (interval of 5 slot pitch) in the positive circumferential direction from the slot 12 in which the (4n+49)th element conductor 31 is arranged. The subsequent (4n+51)th element conductor 31 is located in the 2nd layer (the layer arranged radially outward by 1 layer from the (4n+50)th element conductor 31) in the slot 12 which is spaced away by the first predetermined interval (interval of 6 slot pitch) in the negative circumferential direction from the slot 12 in which the (4n+50)th element conductor 31 is arranged. The subsequent (4n+52)th element conductor 31 is located in the 6th layer (the layer arranged radially outward by 4 layers from the (4n+51)th element conductor 31) in the slot 12 which is spaced away by the second predetermined interval (interval of 5 slot pitch) in the negative circumferential direction from the slot 12 in which the (4n+51)th element conductor 31 is arranged.

In FIG. 6A, the 49th to 52th element conductors 31 are illustrated as one example of (4n+49)th, (4n+50)th, (4n+51)th, (4n+52)th element conductors 31 (where n=0).

In this example, due to the above-described arrangement of the (4n+49)th to (4n+52)th element conductors 31, the slot 12, in which the (4n+51)th element conductor 31 is arranged, is spaced away by an interval of 1 slot pitch (interval of the difference between the first predetermined interval and the second predetermined interval) in the negative circumferential direction from the slot 12 in which the (4n+49)th element conductor 31 is arranged. In addition, the slot 12, in which the (4n+52)th element conductor 31 is arranged, is spaced away by the first predetermined interval (interval of 6 slot pitch) in the negative circumferential direction from the slot 12 in which the (4n+49)th element conductor 31 is arranged.

Figure 8:
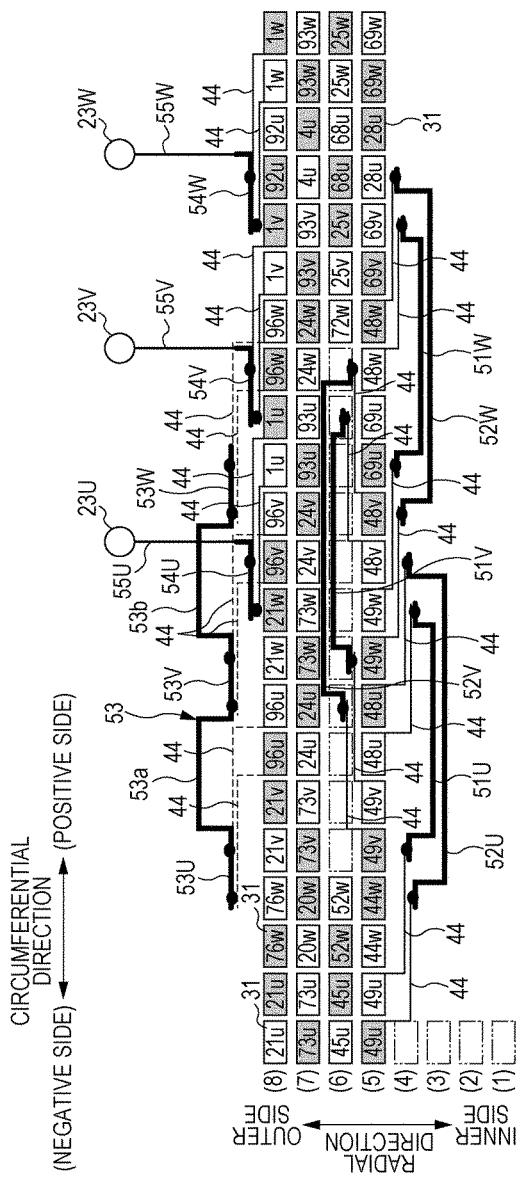
FIG. 8 is a diagram illustrating an arrangement and connection configuration of part of the element conductors included in the coils of each phase in the embodiment.

It should be noted that as seen with reference to FIG. 8, the 49th element conductor 31 of the first coil 21X1 is in the same layer (the 5th layer) as the 48th element conductor 31 indicated as a white box, and is arranged in the slot 12 which is spaced away by an interval of 5 slot pitch (the second predetermined interval) in the negative circumferential direction from the 48th element conductor 31.

Here, the (4n+49)th and (4n+52)th element conductors 31 are the element conductors (the first element conductors) of the first element conductor group, and the (4n+50)th and (4n+51)th element conductors 31 are the element conductors (the second element conductors) of the second element conductor group. Consequently, in the 49th to 72nd partial coils, each of the first element conductors 31 is arranged in the 5th layer or the 6th layer, and each of the second element conductors 31 is arranged in the 1st layer or the 2nd layer.

In the 49th to 72nd element conductors 31, pairs of element conductors 31, 31 (specifically, the pair of the (4n+49)th and (4n+50)th element conductors 31, 31 and the pair of the (4n+51)th and (4n+52)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 6A).

Also, pairs of element conductors 31, 31 (specifically, the pair of the (4n+50)th and (4n+51)th element conductors 31, 31 and the pair of the (4n'+52)th and (4n'+53)th element conductors 31, 31 (where n'=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 6A).

In FIG. 6A, similarly to FIG. 5A, the first crossover portion 43 is indicated by a solid line and the second crossover portion 44 is indicated by a dashed line.

Figure 6B:
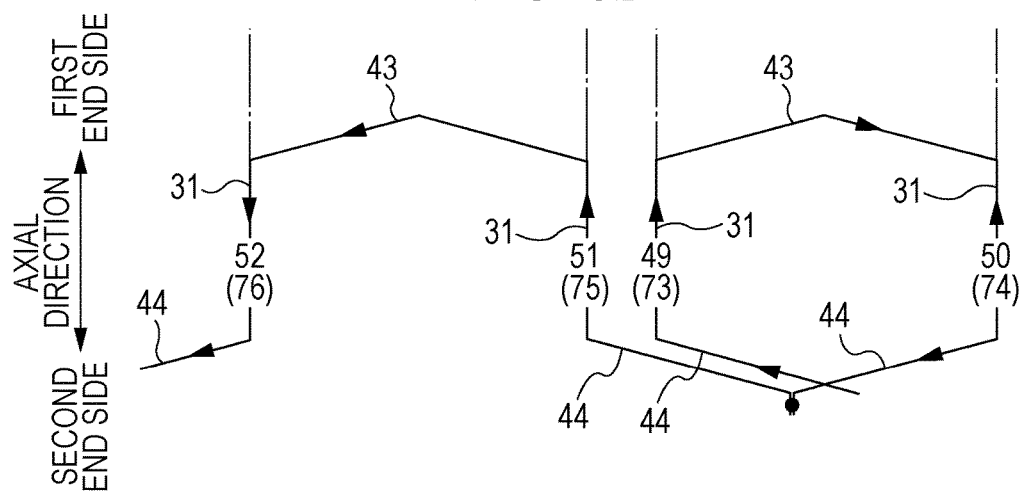

In this manner, the element conductors 31 included in the 49th to 72nd partial coils are connected in series so as to allow electrical conduction sequentially in the pattern as illustrated in FIG. 6B. Thus, the 49th to 72nd partial coils are formed. In this formation, when the set of the 49th to 52nd element conductors 31, 31, 31, 31 connected in series in the above-described manner is defined as one element conductor group, the 49th to 72nd partial coils are formed by continuously connecting 6 sets of the element conductor group at an interval of 12 slot pitch (2×the first predetermined interval) in the negative circumferential direction (the opposite to the direction in the case of the 1st to 48th partial coils) of the stator 11.

Although details will be described later, the 48th element conductor 31 and the 49th element conductor 31 of the first coil 21X1 are connected via a bridge conductor 51X (51U, 51V, or 51W) for each phase on the second end side in the axial direction of the stator 11 as illustrated in FIG. 8. Consequently, the 49th to 72nd partial coils are connected to the 25th to 48th partial coils in series.

Next, the 73rd to 96th element conductors 31 included in the 73rd to 96th partial coils of the first coil 21X1 are arranged in the following manner. As illustrated in FIGS. 3 and 4 or FIG. 6A, the (4n+73)th (n=0, 1, . . . , 5) element conductor 31 is located in the 7th layer in a corresponding slot 12. The subsequent (4n+74)th element conductor 31 is located in the 3rd layer (the layer arranged radially inward by 4 layers from the (4n+73)th element conductor 31) in the slot 12 which is spaced away by the second predetermined interval (interval of 5 slot pitch) in the positive circumferential direction from the slot 12 in which the (4n+73)th element conductor 31 is arranged. The subsequent (4n+75)th element conductor 31 is located in the 4th layer (the layer arranged radially outward by 1 layer from the (4n+74)th element conductor 31) in the slot 12 which is spaced away by the first predetermined interval (interval of 6 slot pitch) in the negative circumferential direction from the slot 12 in which the (4n+74)th element conductor 31 is arranged. The subsequent (4n+76)th element conductor 31 is located in the 8th layer (the layer arranged radially outward by 4 layers from the (4n+75)th element conductor 31) in the slot 12 which is spaced away by the second predetermined interval (interval of 5 slot pitch) in the negative circumferential direction from the slot 12 in which the (4n+75)th element conductor 31 is arranged.

In FIG. 6A, the 73rd to 76th element conductors 31 are illustrated as one example of (4n+73)th, (4n+74)th, (4n+75)th, (4n+76)th element conductors 31 (where n=0).

In this example, the slots 12 in which the (4n+73)th to (4n+76)th element conductors 31 are respectively arranged are the same as the slots 12 in which the (4n+49)th, (4n+50)th, (4n+51)th, (4n+52)th element conductors 31 are respectively arranged.

The (4n+73)th and (4n+76)th element conductors 31 are the element conductors (the first element conductors) of the first element conductor group, and the (4n+74)th and (4n+75)th element conductors 31 are the element conductors (the second element conductors) of the second element conductor group. Consequently, in the 73rd to 96th partial coils, each of the first element conductors 31 is arranged in the 7th layer or the 8th layer, and each of the second element conductors 31 is arranged in the 3rd layer or the 4th layer.

Therefore, the arrangement of the element conductors 31 in the 73rd to 96th partial coils are obtained by shifting the entire arrangement of the element conductors 31 in the 49th to 72nd partial coils radially outward of the stator 11 by 2 layers.

Similarly to the case of the 49th to 72nd partial coils, in the 73rd to 96th element conductors 31, pairs of element conductors 31, 31 (specifically, the pair of the (4n+73)th and (4n+74)th element conductors 31, 31 and the pair of the (4n+75)th and (4n+76)th element conductors 31, 31) having the second predetermined interval (interval of 5 slot pitch) in the circumferential direction of the stator 11 and a predetermined interval (interval of 4 layers) in the radial direction of the stator 11 are each connected via the first crossover portion 43 on the first end side in the axial direction of the stator 11 as a pair of a first element conductor 31 and a second element conductor 31 to be connected (see FIG. 6A).

Also, pairs of element conductors 31, 31 (specifically, the pair of the (4n'+74)th and (4n'+75)th element conductors 31, 31 and the pair of the (4n'+76)th and (4n'+77)th element conductors 31, 31 (where n°=0, 1, . . . , 4)) having the first predetermined interval (interval of 6 slot pitch) in the circumferential direction of the stator 11 and being in adjacent layers in the radial direction of the stator 11 are each connected via the second crossover portion 44 on the second end side in the axial direction of the stator 11 as a pair of two first element conductors 31, 31 or a pair of two second element conductors 31, 31 to be connected (see FIG. 6A).

In this manner, the element conductors 31 included in the 73rd to 96th partial coils are connected in series so as to allow electrical conduction sequentially in the same pattern as the case of the 49th to 72nd partial coils illustrated in FIG. 6B. Thus, the 73rd to 96th partial coils are formed.

In this formation, when the set of the 73rd to 76th element conductors 31, 31, 31, 31 connected in series in the above-described manner is defined as one element conductor group, the 73rd to 96th partial coils are formed by continuously connecting 6 sets of the element conductor group at an interval of 12 slot pitch (2×the first predetermined interval) in the negative circumferential direction of the stator 11.

Figure 7B:
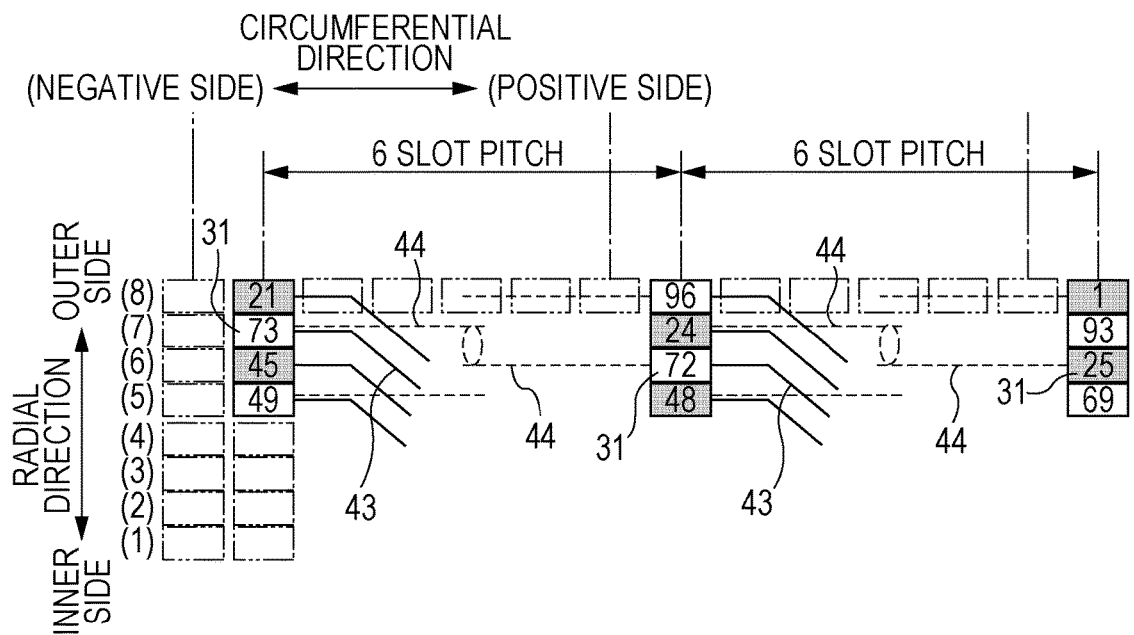

It should be noted that as illustrated in FIG. 7B, the 72nd element conductor 31 in the 49th to 72nd partial coils and the 73rd element conductor 31 in the 73rd to 96th partial coils are arranged in the slots 12, 12 having the first predetermined interval (interval of 6 slot pitch) in the circumferential direction of the stator 11 and being in adjacent layers (the 6th layer, the 7th layer) in the radial direction of the stator 11. The element conductors 31, 31 are connected via the second crossover portion 44 on the second end side in the axial direction of the stator 11. Consequently, the 73rd to 96th partial coils are connected to the 49th to 72nd partial coils in series.

What has been described is the entire arrangement and connection configuration of the element conductors 31 included in the first coil 21X1 of each phase.

The first coils 21U1, 21V1, 21W1 of U phase, V phase, and W phase, respectively, are arranged as follows. That is, as seen with reference to FIGS. 3 and 4, the kth (k= 1, 2, . . . , 96) element conductor 31 of the first coil 21V1 of V phase is arranged in the slot 12 which is spaced away by an interval of 4 slot pitch in the positive circumferential direction of the stator 11 from the slot 12 in which the kth element conductor 31 of the first coil 21U1 of U phase is arranged.

Similarly, the kth (k=1, 2, . . . , 96) element conductor 31 of the first coil 21W1 of W phase is arranged in the slot 12 which is spaced away by an interval of 4 slot pitch in the positive circumferential direction of the stator 11 from the slot 12 in which the kth element conductor 31 of the first coil 21V1 of V phase is arranged.

Consequently, the first coils 21U1, 21V1, 21W1 of U phase, V phase, and W phase, respectively, are arranged to be sequentially shifted by an interval of 4 slot pitch in the circumferential direction of the stator 11.

Next, the second coil 21X2 of any phase will be described. Similarly to case of the first coil 21X1, the second coil 21X2 of any phase is formed by connecting the 1st to 24th, the 25th to 48th, the 49th to 72nd, and the 73rd to 96th partial coils in series, the 1st to 24th partial coils being formed by connecting 1st to 24th element conductors 31 in series, the 25th to 48th partial coils being formed by connecting 25th to 48th element conductors 31 in series, the 49th to 72nd partial coils being formed by connecting 49th to 72nd element conductors 31 in series, the 73rd to 96th partial coils being formed by connecting 73rd to 96th element conductors 31 in series.

Similarly to case of the first coil 21X1, the arrangement and connection configuration of the element conductors 31 of the second coil 21X2 are mainly divided into the configuration of the 1st to 24th partial coils, the configuration of the 25th to 48th partial coils, the configuration of the 49th to 72nd partial coils, and the configuration of the 73rd to 96th partial coils.

In addition, similarly to the case of the first coil 21X1, the element conductors 31 (24 element conductors 31) included in the above-mentioned each partial coils of the second coil 21X2 includes the first element conductor group and the second element conductor group, the first element conductor group including a plurality of element conductors 31 (the first element conductors) which are respectively inserted in a plurality of slots 12 arranged in the circumferential direction of the stator 11 at a pitch (6 slot pitch) of the first predetermined interval, the second element conductor group including the plurality of element conductors 31 (the second element conductors) which are respectively inserted in a plurality of slots 12 arranged in the circumferential direction of the stator 11 at the pitch (6 slot pitch) of the first predetermined interval with a phase shifted in the circumferential direction of the stator 11 with respect to the slots 12 in which the element conductors 31 of the first element conductor group are inserted.

In this configuration, the 1st to 48th element conductors 31 (the element conductors 31 included in the 1st to 24th partial coils and the 25th to 48th partial coils) of the second coil 21X2, and the 49th to 96th element conductors 31 (the element conductors 31 included in the 49th to 72nd partial coils and the 73rd to 96th partial coils) of the second coil 21X2 have the same arrangement and connection configuration as that of the first coil 21X1.

Therefore, also in the second coil 21X2, the slots 12 (the second slot) in which the element conductors 31 of the second element conductor group included in each partial coils are inserted, are shifted in phase in the positive circumferential direction of the stator 11 by the second predetermined interval (an interval of 5 slot pitch) with respect to the slots 12 (the first slot) in which the element conductors 31 of the first element conductor group are inserted, the second predetermined interval being smaller than the first predetermined interval.

In each of the 1st to 24th partial coils, the 25th to 48th partial coils, the 49th to 72nd partial coils, and the 73rd to 96th partial coils of the second coil 21X2, similarly to the case of the first coil 21X1, the first element conductors 31 are each arranged in a layer (one of the 5th to 8th layers) on the radially outer side of the stator 11. Also, similarly to the case of the first coil 21X1, the second element conductors 31 are each arranged in a layer (one of the 1st to 4th layers) on the radially inner side of the stator 11.

However, in the second coil 21X2, the interval (interval in the circumferential direction of the stator 11) between the 48th and 49th element conductors 31, 31 is different from the interval in the first coil 21X1.

Specifically, as seen with reference to FIGS. 3 and 4, the 1st to 48th element conductors 31 of the second coil 21X2 are arranged in the slots to which the 1st to 48th element conductors 31 of the first coil 21X1 in phase with the second coil 21X2 are respectively adjacent in the positive circumferential direction to the slots 12.

That is, the entire 1st to 48th element conductors 31 (the element conductors 31 included in the 1st to 24th partial coils and the 25th to 48th partial coils) of the second coil 21X2 are arranged in the positions in which the entire 1st to 48th element conductors 31 of the first coil 21X1 are shifted by an interval of 1 slot pitch in the positive circumferential direction.

On the other hand, the 49th to 96th element conductors 31 of the second coil 21X2 are arranged in the slots respectively adjacent to the slots in which the 49th to 96th element conductors 31 of the first coil 21X1 are arranged.

That is, the entire 49th to 96th element conductors 31 (the element conductors 31 included in the 49th to 72nd partial coils and the 73rd to 96th partial coils) of the second coil 21X2 are arranged in the positions in which the entire 49th to 96th element conductors 31 of the first coil 21X1 are shifted by an interval of 1 slot pitch in the negative circumferential direction.

Therefore, as seen with reference to FIG. 8, the interval (interval in the circumferential direction of the stator 11) between the 48th and 49th element conductors 31, 31 provides an interval of 5 slot pitch in the first coil 21X1, whereas the interval provides an interval of 7 slot pitch in the second coil 21X2.

Although details will be described later, the 48th and 49th element conductors 31, 31 of the second coil 21X2 are connected via a bridge conductor 52X (52U, 52V, or 52W) for each phase on the second end side in the axial direction of the stator 11 as illustrated in FIG. 8.

The arrangement and connection configuration of the element conductors 31 of the second coil 21X2 are the same as those of the first coil 21X1 except for what has been described above. Also, the inter arrangement configuration of the second coils 21U2, 21V2, 21W2 of U phase, V phase, and W phase is the same as the inter arrangement configuration of the first coils 21U1, 21V1, 21W1.

Hereinafter, the connection structure (structure of the first crossover portion 43 and the second crossover portion 44) between the element conductors 31, 31 in each of the first coil 21X1 and the second coil 21X2 of any phase will be described more specifically.

Figure 9A:
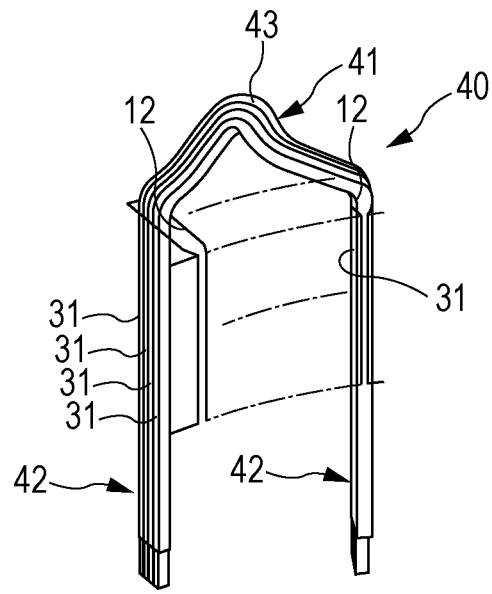
FIG. 9A is a perspective view of a segment conductor that forms a pair of a first element conductor and a second element conductor in the embodiment.
Figure 9B:
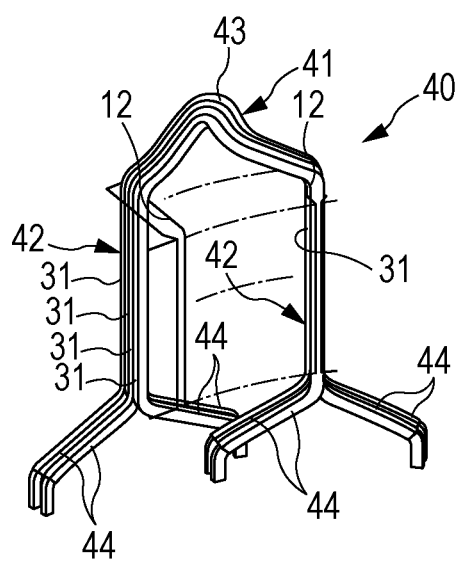
FIG. 9B is a perspective view of the segment conductor in which the end portions of the legs of the segment conductor are bent.

In the present embodiment, each element conductor 31 is formed as part of a segment conductor 40 illustrated in FIGS. 9A and 9B. The segment conductor 40 is a bundle of four bifurcated conductor members 41 that each form a pair of element conductors 31, 31 (a pair of the first element conductor 31 and the second element conductor 31) to be connected via the first crossover portion 43.

The segment conductor 40 is produced by forming a bundle of conductor wires into a bifurcated shape (substantially U-shape) as illustrated in FIG. 9A, the bundle of conductor wires being four mutually insulated conductor wires aligned in a row in a transverse direction. Each of the four wires in a bifurcated shape included in the segment conductor 40 is a bifurcated conductor member 41.

Each bifurcated conductor member 41 of the segment conductor 40, formed in a bifurcated shape has a structure integrally including two legs 42, 42 to be inserted in different slots 12, 12 of the stator 11, and the first crossover portion 43 serving as a linking portion between the base ends of the legs 42, 42.

A leg 42 on one side of the two legs 42, 42 of each bifurcated conductor member 41 is a leg for forming the first element conductor 31 (hereinafter may be referred to as a first element conductor formation leg 42). Also, a leg 42 on the other side of the two legs 42, 42 of each bifurcated conductor member 41 is a leg (hereinafter may be referred to as a second element conductor formation leg 42) for forming a second element conductor 31 to be connected to a first element conductor 31 which is formed by the leg 42 on the one side.

In this configuration, the segment conductors 40 are formed such that the two legs 42, 42 of each bifurcated conductor member 41 extend in the axial direction of the stator 11 with predetermined intervals in the circumferential direction and the radial direction of the stator 11, respectively. As illustrated in FIGS. 5A and 6A, the interval between the legs 42, 42 in the circumferential direction of the stator 11 is the second predetermined interval (interval of 5 slot pitch).

The interval between the legs 42, 42 in the radial direction of the stator 11 is an interval for four layers as illustrated in FIGS. 5A and 6A.

A bundle of the first element conductor formation legs 42 and a bundle of the second element conductor formation legs 42 of each segment conductor 40 are inserted in two slots 12, 12 from the first end side in the axial direction of the stator 11, the two slots having the second predetermined interval (interval of 5 slot pitch) in the circumferential direction of the stator 11, and the bundle of the 5th to 8th layers of first element conductor 31 are thereby formed due to the bundle of first element conductor formation legs 42 in one slot 12 of the two slots 12, 12. In addition, the bundle of the 1st to 4th layers of second element conductor 31 is formed due to the bundle of second element conductor formation legs 42 in the other slot 12 (the slot 12 being spaced away by the second predetermined interval in the positive circumferential direction from the one slot 12) of the two slots 12, 12.

On the first end side in the axial direction of the stator 11, the 1st to 4th layers of element conductor 31 are respectively connected via the first crossover portions 43 to the 5th to 8th layers of element conductor 31 having an interval for four layers in the radial direction of the stator 11.

In this configuration, the arrangement order (the arrangement order in the radial direction of the stator 11) of the 5th to 8th layers of first element conductor 31 is the same as the arrangement order (the arrangement order in the radial direction of the stator 11) of the 1st to 4th layers of second element conductor 31 to be respectively connected to the 5th to 8th layers of first element conductor 31. Consequently, the four bifurcated conductor members 41 of the segment conductor 40 including the respective first crossover portions 43 are aligned in the radial direction of the stator 11.

In this manner, each bifurcated conductor member 41 of the segment conductor 40 forms a pair of a first element conductor 31 and a second element conductor 31 by the two legs 42, 42, the first element conductor 31 being arranged in one of four layers (the 5th layer to the 8th layer) on the radially outer side of the stator 11 in one slot 12, the second element conductor 31 being arranged in one of four layers (the 1st layer to the 4th layer) on the radially inner side of the stator 11 in the other slot 12 which is spaced away by an interval of 5 slot pitch in the positive circumferential direction of the stator 11 from the one slot 12.

In addition, each bifurcated conductor member 41 forms the first crossover portion 43 that connects a pair of the first element conductor 31 and the second element conductor 31 on the first end side in the axial direction of the stator 11.

In each slot 12 of the stator 11, the bundle of first element conductor formation legs 42 of one of two segment conductors 40 is inserted at the position of the 5th to 8th layers, and the bundle of second element conductor formation legs 42 of the other of the two segment conductors 40 is inserted at the position of the 1st to 4th layers. In this manner, the 1st to 8th layers of element conductor 31 in each slot 12 are formed.

As described above, the bundle of first element conductor formation legs 42 and the bundle of second element conductor formation legs 42 of the four bifurcated conductor members 41 included in the segment conductor 40 are inserted in the slot 12, thereby simultaneously achieving arrangement of the 1st to 96th element conductors 31 of each of the first coil 21X1 and the second coil 21X2 of any phase in the slot 12 in the pattern as illustrated in FIGS. 3 and 4, and also connection of the pair of the first element conductor 31 and the second element conductor 31 to be connected on the first end side in the axial direction of the stator 11 as illustrated in FIGS. 5A and 5B.

The end portion of each leg 42, which is inserted in the slot 12 from the first end side in the axial direction, of the segment conductor 40 is protruding through the slot 12 to the second end side in the axial direction as illustrated in FIG. 9A. The end portions of four legs 42 of each segment conductor 40 are then separated from each other and bent in the circumferential direction of the stator 11 as illustrated in FIG. 9B, the end portions protruding through the slot 12 to the second end side in the axial direction. This bending forms the second crossover portion 44 which allows each element conductor 31 of the slot 12 to be connected to another element conductor 31 on the second end side in the axial direction of the stator 11.

In this formation, as illustrated in FIGS. 5A and 6A, the second crossover portions 44 respectively contiguous to the 2nd, 4th, 5th, and 7th layers of element conductor 31 are bent in the positive circumferential direction. Also, the second crossover portions 44 respectively contiguous to the 1st, 3rd, 6th, and 8th layers of element conductor 31 are bent in the negative circumferential direction. Consequently, the second crossover portions 44 respectively contiguous to the 2nd, 4th, 5th, and 7th layers of element conductor 31 and the second crossover portions 44 respectively contiguous to the 1st, 3rd, 6th, and 8th layers of element conductor 31 are bent so as to be closer to each other in the circumferential direction of the stator 11.

It should be noted that the second crossover portion 44 contiguous to an element conductor 31 has approximately half the length of 6 slot pitch (the second predetermined interval) in the circumferential direction of the stator 11. As illustrated in FIG. 9B, the end portion of each second crossover portion 44 is bent so as to stand upright in the axial direction of the stator 11.

In order to allow electrical conduction in the 1st to 96th element conductors 31 of each of the first coil 21X1 and the second coil 21X2 of any phase in the order of connection illustrated in FIGS. 3 and 4, the end portions of second crossover portions 44 are directly connected to each other or connected via bridge conductors 51X, 52X described below, the second crossover portions 44 being respectively contiguous to a pair of the first element conductors 31, 31 or a pair of the second element conductors 31, 31 which are adjacent in the connection order.

More particularly, in each of the first coil 21X1 and the second coil 21X2 of any phase, the pairs of element conductors 31, 31 to be connected on the second end side in the axial direction of the stator 11 are a pair of the (4na+2)th and (4na+3)th (where na=0, 1, . . . , 23) second element conductors 31, 31, and a pair of the (4nb+4)th and (4nb+5)th (where nb=0, 1, . . . , 22) first element conductors 31, 31.

Out of these pairs of element conductors 31, 31 (pairs of the first element conductors 31, 31 and pairs of the second element conductors 31, 31), in each of the pairs of element conductors 31, 31 except a pair of the 48th and 49th element conductors 31, 31, the positions (layers) of the element conductors 31, 31 are shifted by one layer in the radial direction of the stator 11 as in the pattern illustrated in FIGS. 3 and 4 (for example, see a pair of the 2nd and 3rd element conductors 31, 31, a pair of the 28th and 29th element conductors 31, 31 each indicated as a white box in FIG. 5A, and a pair of the 70th and 71st element conductors 31, 31 each indicated as a gray box in FIG. 5A).

The end portions of the second crossover portions 44 respectively contiguous to such a pair of element conductors 31, 31 are closely positioned so as to face each other in the radial direction of the stator 11.

Consequently, in the present embodiment, in the pairs of element conductors 31, 31 except a pair of the 48th and 49th element conductors 31, 31 out of the pairs of element conductors 31, 31 to be connected on the second end side in the axial direction of the stator 11, the end portions of the second crossover portions 44 respectively contiguous to such a pair of element conductors 31, 31 are directly connected. The connection is made, for example, by welding.

In this case, the connection can be made easily because the end portions of the second crossover portions 44 respectively contiguous to the pair of element conductors 31, 31 are closely positioned.

In this manner, the second crossover portion 44 is formed as a member for connecting each pair of the first element conductors 31, 31 to be connected and each pair of the second element conductors 31, 31 to be connected on the second end side in the axial direction of the stator 11 in such a manner that the end portions of the legs 42, 42 forming the pair of element conductors 31, 31 are bent to be closer to each other in the circumferential direction of the stator 11.

As supplemental remarks, in the 1st to 24th partial coils in each of the first coil 21X1 and the second coil 21X2 of any phase, as illustrated in FIGS. 5A and 6A, a pair of the 3rd and 4th layers of second element conductors 31, 31 adjacent in the connection order, and a pair of the 7th and 8th layers of first element conductors 31, 31 adjacent in the connection order are connected via the respective second crossover portions 44 on the second end side in the axial direction of the stator 11 as described above.

Also, in the 25th to 48th partial coils, as illustrated in FIGS. 5A and 6A, a pair of the 1st and 2nd layers of second element conductors 31, 31 adjacent in the connection order, and a pair of the 5th and 6th layers of first element conductors 31, 31 adjacent in the connection order are connected via the respective second crossover portions 44 on the second end side in the axial direction of the stator 11 as described above.

As illustrated in FIG. 7A, although a pair of the 24th and 25th element conductors 31, 31 are connected via a second crossover portion 44 on the second end side in the axial direction of the stator 11 as described above, the above-mentioned pair of the element conductors 31, 31 is a pair of first element conductors in the 6th and 7th layers.

Thus, a set of layers of element conductors 31, 31 to be connected in the 1st to 24th partial coils on the second end side in the axial direction of the stator 11, and a set of layers of element conductors 31, 31 to be connected in the 25th to 48th partial coils on the second end side in the axial direction of the stator 11 are switched over after the connection of the 24th and 25th element conductors 31, 31.

Also, in the 49th to 72nd partial coils in each of the first coil 21X1 and the second coil 21X2 of any phase, as illustrated in FIGS. 5A and 6A, a pair of the 1st and 2nd layers of second element conductors 31, 31 adjacent in the connection order, and a pair of the 5th and 6th layers of first element conductors 31, 31 adjacent in the connection order are connected via the respective second crossover portions 44 on the second end side in the axial direction of the stator 11 as described above.

In the 73rd to 96th partial coils, as illustrated in FIGS. 5A and 6A, a pair of the 3rd and 4th layers of second element conductors 31, 31 adjacent in the connection order, and a pair of the 7th and 8th layers of first element conductors 31, 31 adjacent in the connection order are connected via the respective second crossover portions 44 on the second end side in the axial direction of the stator 11 as described above.

As illustrated in FIG. 7B, although a pair of the 72nd and 73rd element conductors 31, 31 are connected via a second crossover portion 44 on the second end side in the axial direction of the stator 11 as described above, the above-mentioned pair of the element conductors 31, 31 is a pair of first element conductors in the 6th and 7th layers.

Thus, a set of layers of element conductors 31, 31 to be connected in the 49th to 72nd partial coils on the second end side in the axial direction of the stator 11, and a set of layers of element conductors 31, 31 to be connected in the 73rd to 96th partial coils on the second end side in the axial direction of the stator 11 are switched over after the connection of the 72nd and 73rd element conductors 31, 31.

It should be noted that in the present embodiment, in each of the first coil 21X1 and the second coil 21X2 of any phase, out of the pairs of the first element conductor 31 and the second element conductor 31 to be connected via respective first crossover portions 43, two pairs of the first element conductor 31 and the second element conductor 31 each pair including element conductors 31, 31 adjacent in the connection order (for example, the pair of the (4n+1)th and (4n+2)th element conductors 31, 31 and the pair of the (4n+3)th and (4n+4)th element conductors 31, 31) except a pair of the 47th and 48th element conductor 31, 31 and a pair of the 49th and 50th element conductor 31, 31 correspond to the first element conductor pair and the second element conductor pair in the present disclosure.

Next, a configuration will be described in which a pair of the 48th and 49th element conductors 31, 31 is connected on the second end side in the axial direction of the stator 11 in each of the first coil 21X1 and the second coil 21X2 of any phase.

A pair of the 48th and 49th element conductors 31, 31 is a pair of the first element conductors arranged in the 5th layer in each of the first coil 21X1 and the second coil 21X2. As described above, a pair of the 48th and 49th element conductors 31, 31 is arranged in slots 12, 12 having an interval of 5 slot pitch in the circumferential direction of the stator 11 in the first coil 21X1, and in slots 12, 12 having an interval of 7 slot pitch in the circumferential direction of the stator 11 in the second coil 21X2.

Also, as a consequence of the above-described bending (bending in the circumferential direction of the stator 11) of the second crossover portions 44 of the bifurcated conductor members 41 of each segment conductor 40, the second crossover portions 44, 44 respectively contiguous to the 48th and 49th element conductors 31, 31 are bent in the positive circumferential direction as illustrated in FIG. 8.

In FIG. 8, for convenience of illustration, the second crossover portions 44, 44 respectively contiguous to the 48th and 49th element conductors 31, 31 are illustrated with displacement from the actual position in the radial direction of the stator 11. The second crossover portions 44, 44 are actually arranged in the position of the same layer (the 5th layer) as the layer of the 48th and 49th element conductors 31, 31 in the radial direction of the stator 11.

Therefore, the end portions of the second crossover portions 44, 44 respectively contiguous to the 48th and 49th element conductors 31, 31 have an interval of approximately 5 slot pitch in the circumferential direction of the stator 11 in the first coil 21X1, and have an interval of approximately 7 slot pitch in the circumferential direction of the stator 11 in the second coil 21X2.

Also, the end portions of the second crossover portions 44, 44 respectively contiguous to the 48th and 49th element conductors 31, 31 in the first coil 21X1 and the second coil 21X2 of any phase are aligned in the order as illustrated in FIG. 8 in the circumferential direction of the stator 11.

Specifically, the following pairs of the end portions of the second crossover portions 44, 44 are aligned sequentially from the negative circumferential side to the positive circumferential side: the pair of the end portions of the second crossover portions 44, 44 respectively contiguous to the 49th element conductors 31, 31 of the first coil 21X1 and the second coil 21X2 of U phase; the pair of the end portions of the second crossover portions 44, 44 respectively contiguous to the 49th element conductors 31, 31 of the first coil 21X1 and the second coil 21X2 of V phase; the pair of the end portions of the second crossover portions 44, 44 respectively contiguous to the 48th element conductors 31, 31 of the first coil 21X1 and the second coil 21X2 of U phase; the pair of the end portions of the second crossover portions 44, 44 respectively contiguous to the 49th element conductors 31, 31 of the first coil 21X1 and the second coil 21X2 of W phase; the pair of the end portions of the second crossover portions 44, 44 respectively contiguous to the 48th element conductors 31, 31 of the first coil 21X1 and the second coil 21X2 of V phase; and the pair of the end portions of the second crossover portions 44, 44 respectively contiguous to the 48th element conductors 31, 31 of the first coil 21X1 and the second coil 21X2 of W phase.

Thus, in the present embodiment, in the first coil 21X1 of any phase, the second crossover portions 44, 44 respectively contiguous to the 48th and 49th element conductors 31, 31 are connected via a bridge conductor 51X (51U, 51V, 51W). Similarly, in the second coil 21X2, the second crossover portions 44, 44 respectively contiguous to the 48th and 49th element conductors 31, 31 are connected via a bridge conductor 52X (52U, 52V, 52W).

In this configuration, the bridge conductors 51X, 52X in each phase is formed in a projecting shape (specifically, a rectangularly projecting shape) so as to protrude in the radial direction of the stator 11 between the end portion of the second crossover portion 44 contiguous to the 48th element conductor 31 and the end portion of the second crossover portion 44 contiguous to the 49th element conductor 31.

Also, in order to allow the bridge conductor 51X of the first coil 21X1 to be located inward of the bridge conductor 52X of the second coil 21X2 for each phase, the width of the bridge conductor 51X in the radial direction of the stator 11 is set to be smaller than the width of the bridge conductor 52X, and the length of the bridge conductor 51X in the circumferential direction of the stator 11 is set to be smaller than the length of the bridge conductor 52X.

It should be noted that the length of the bridge conductor 51X in the circumferential direction of the stator 11 is approximately the same as the interval (interval of 5 slot pitch) between the 48th and 49th element conductors 31, 31 of the first coil 21X1. Also, the length of the bridge conductor 52X in the circumferential direction of the stator 11 is approximately the same as the interval (interval of 7 slot pitch) between the 48th and 49th element conductors 31, 31 of the second coil 21X2.

In the subsequent description, the width of the bridge conductors 51X, 52X in the radial direction of the stator 11 is referred to as a projection height, and the length of the bridge conductors 51X, 52X in the circumferential direction of the stator 11 is referred to as a circumferential length.

For each phase, both ends of the bridge conductor 51X are connected by welding to the corresponding end portions of the second crossover portions 44, 44 respectively contiguous to the 48th and 49th element conductors 31, 31 in the first coil 21X1. Similarly, both ends of the bridge conductor 52X are connected by welding to the corresponding end portions of the second crossover portions 44, 44 respectively contiguous to the 48th and 49th element conductors 31, 31 in the second coil 21X2.

Figure 11:
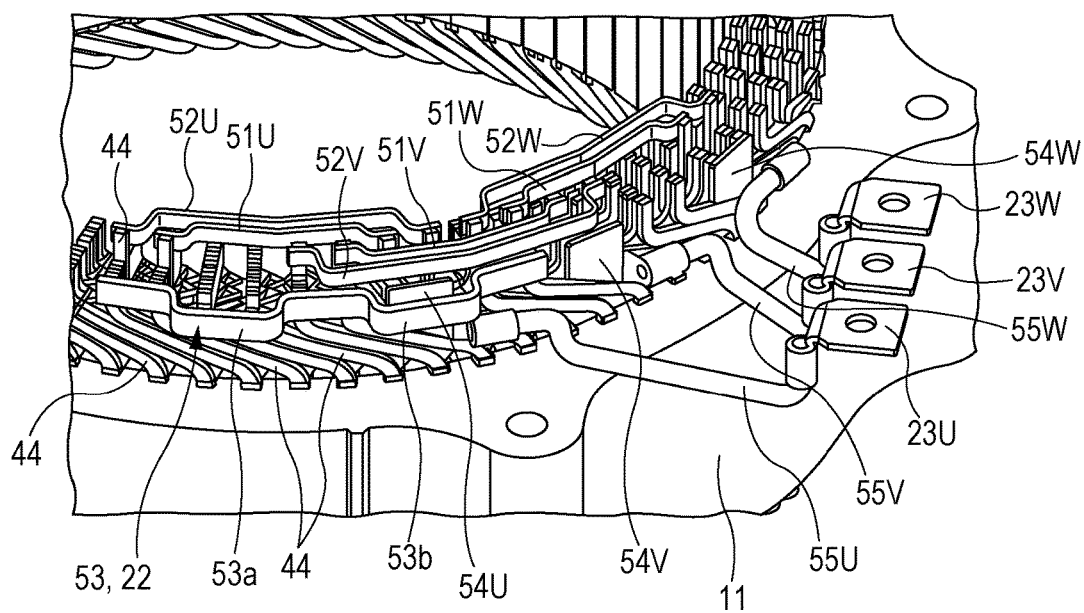
FIG. 11 is a perspective view of a structure of the one end side of the stator with coils mounted of the rotary electric machine according to the embodiment.

In this configuration, in the present embodiment, the respective end portions of the second crossover portions 44, 44 respectively contiguous to the 48th and 49th element conductors 31, 31 are formed so as to protrude in the axial direction of the stator 11 (height in the axial direction is increased) by a length from the end portion of a second crossover portion 44 contiguous to another element conductor 31, the length being approximately the same as the width (thickness) of the bridge conductors 51X, 52X in the axial direction of the stator 11 (see FIG. 11). It should be noted that the width (thickness) of the bridge conductors 51X, 52X in the axial direction of the stator 11 includes the thickness of an insulating member (such as insulating coating) provided on the periphery of the bridge conductors 51X, 52X.

For this reason, it is possible to easily weld each end of the bridge conductors 51X, 52X to the end portions of the 48th or 49th element conductor 31 by an operation in the radial direction of the stator 11.

In addition, in order to avoid interference between the bridge conductors 51X, 52X for one phase and the bridge conductors 51X, 52X of the other phase, the bridge conductors 51X, 52X for the phases are formed such that out of the bridge conductors 51U, 52U of U phase, the bridge conductors 51V, 52V of V phase, and the bridge conductors 51W, 52W of W phase, the bridge conductors for two phases located on both sides in the circumferential direction of the stator 11 and the bridge conductor located between the bridge conductors for the two phases are made to project in opposite directions to each other in the radial direction of the stator 11 (oppositely protruding in the radial direction).

Specifically, in the present embodiment, out of the bridge conductors 51U, 52U of U phase, the bridge conductors 51V, 52V of V phase, and the bridge conductors 51W, 52W of W phase, the bridge conductors for two phases located on both sides in the circumferential direction of the stator 11 are the bridge conductors 51U, 52U of U phase and the bridge conductors 51W, 52W of W phase. In this case, the end of the longer bridge conductor 52U of U phase in the positive circumferential direction, and the end of the longer bridge conductor 52W of W phase in the negative circumferential direction have an interval of approximately 1 slot pitch.

The bridge conductors 51U, 52U of U phase and the bridge conductors 51W, 52W of W phase are formed so as to project (protrude) radially inward of the stator 11.

Also, the circumferential central portion of the bridge conductors 51V, 52V of V phase is located in the middle of the bridge conductors 51U, 52U of U phase and the bridge conductors 51W, 52W of W phase.

The bridge conductors 51V, 52V of V phase are formed so as to project radially outward of the stator 11, that is, to project (protrude) in the opposite direction to the bridge conductors 51U, 52U of U phase and the bridge conductors 51W, 52W of W phase.

It should be noted that the projection height of the radially inward projecting bridge conductors 51U, 52U of U phase and bridge conductors 51W, 52W of W phase is set to such a height that assures the bridge conductors 51U, 52U, 51W, 52W are not protruding inwardly from the inner circumferential surface of the stator 11.

In addition, the projection height of the radially outward projecting bridge conductors 51V, 52V of V phase is set to such a height that assures the bridge conductors 51V, 52V are not protruding outwardly from the outer circumferential surface of the stator 11.

Figure 10:
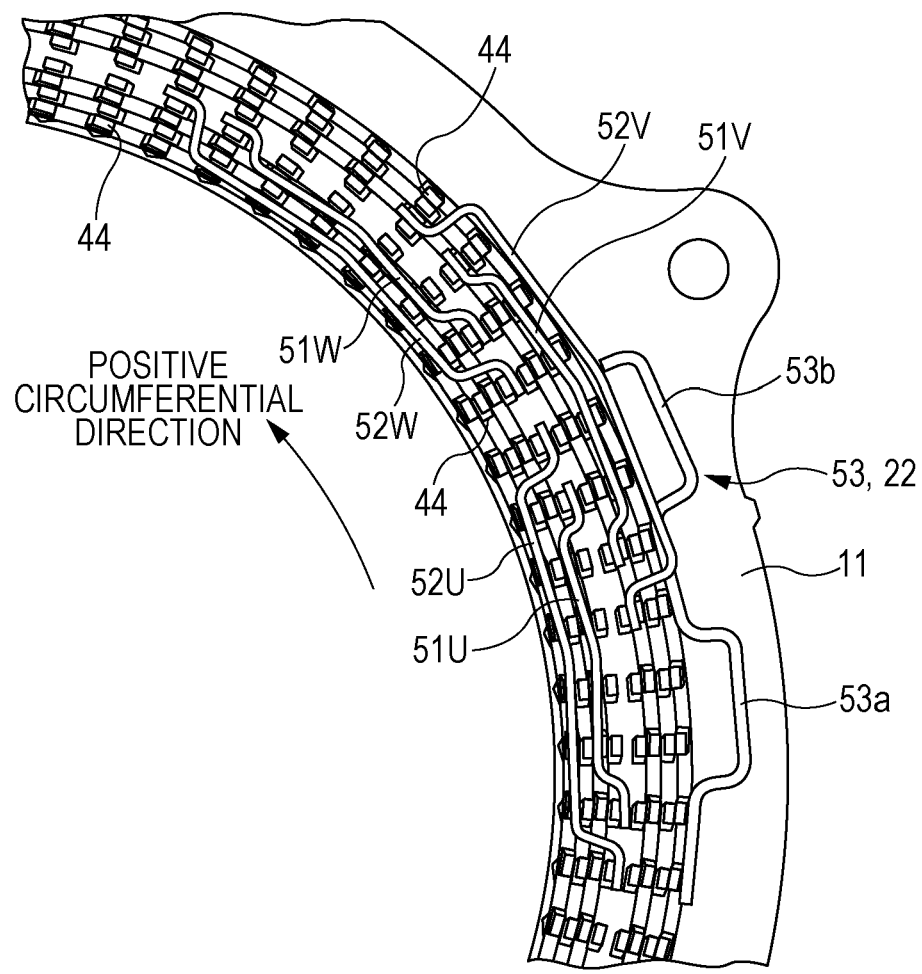
FIG. 10 is a view of bridge conductors and neutral point forming conductors arranged on one end side of the stator of the rotary electric machine according to the embodiment, the view being taken in an axial direction of the stator.

FIG. 10 is a view of part of the end of the stator 11 on the second end side in the axial direction, the stator 11 being provided with the first coil 21X1 and the second coil 21X2 of each phase, the view being taken in the axial direction of the stator 11. FIG. 11 is a perspective view of the part of the end of the stator 11 on the second end side in the axial direction.

The above-described arrangement and formation of the bridge conductors 51U, 52U of U phase, the bridge conductors 51V, 52V of V phase, and the bridge conductors 51W, 52W of W phase can prevent mutual interference between the bridge conductors 51U, 52U, 51V, 52V, 51W, 52W as seen in FIGS. 10 and 11.

In addition, even when the interval between the inner circumferential surface and the outer circumferential surface of the stator 11 is relatively small for the bridge conductors 51U, 52U, 51V, 52V, 51W, 52W, the bridge conductors are prevented from protruding inwardly from the inner circumferential surface and outwardly from the outer circumferential surface of the stator 11, and thus the bridge conductors are arranged within the interval between the inner circumferential surface and the outer circumferential surface.

Also, the bridge conductors 51U, 52U, 51V, 52V, 51W, 52W are densely arranged to be close to each other on the second end side of the stator 11, thereby making it is possible to efficiently execute connection work between the bridge conductors and the second crossover portions 44 by welding or the like.

The height positions of the bridge conductors 51U, 52U, 51V, 52V, 51W, 52W in the axial direction of the stator 11 are the same for each bridge conductor. Moreover, the height position of the bridge conductors is sufficiently close to the end face of the stator 11 on the second end side in the axial direction because the height position is at a position which is higher than the second crossover portions 44 by the thickness of the bridge conductors, the second crossover portions 44 connecting the pairs of element conductors 31, 31 except the 48th and 49th element conductors 31, 31.

Consequently, the axial length of the rotary electric machine including the coil 21X of each phase can be kept at a minimum necessary length, and thus miniaturization of the rotary electric machine can be achieved.

In the present embodiment, the bridge conductors 51U, 52U of U phase and the bridge conductors 51W, 52W of W phase are each formed so as to project (protrude) radially inward of the stator 11, and the bridge conductors 51V, 52V of V phase are formed so as to project (protrude) radially outward of the stator 11. However, the bridge conductors 51U, 52U of U phase and the bridge conductors 51W, 52W of W phase may be formed so as to project radially outward of the stator 11, and the bridge conductors 51V, 52V of V phase may be formed so as to project radially inward of the stator 11.

As supplemental remarks, in each of the first coil 21X1 and the second coil 21X2 of any phase, the 48th and 49th element conductors 31, 31 correspond to the Ath element conductor and the Bth element conductor in the present disclosure. The respective ends (more particularly, the end portions of the second crossover portions 44, 44 respectively contiguous to the 48th and 49th element conductors 31, 31) of the 48th and 49th element conductors 31, 31 connected via the bridge conductor 51X or 52X correspond to the ath end and the bth end in the present disclosure.

The element conductors 31 formed in the above manner on one end side of each of the first coil 21X1 and the second coil 21X2 of any phase of U phase, V phase, and W phase are connected to the neutral point 22 in common with the three phases on the second end side in the axial direction of the stator 11 as described below. The element conductors 31 on the other end side of each of the first coil 21X1 and the second coil 21X2 of any phase are connected to the current I/O terminals 23X of the phase on the second end side in the axial direction of the stator 11 as described below.

In the present embodiment, the element conductor 31 connected to the neutral point 22 is the 96th element conductor 31 in any of the first coil 21X1 and the second coil 21X2 of each phase. The neutral point 22 is constituted by a neutral point forming conductor 53 which is formed in a rectangular shape as illustrated in FIGS. 8 and 10.

As illustrated in FIG. 8, the neutral point forming conductor 53 sequentially includes U-phase connecting portion 53U, V-phase connecting portion 53V, and W-phase connecting portion 53W at a constant interval (interval of approximately 4 slot pitch) in the positive circumferential direction of the stator 11, the U-phase connecting portion 53U for connecting the end portions of the second crossover portions 44 contiguous to the respective 96th element conductors 31, 31 of the first coil 21U1 and the second coil 21U2 of U phase, the V-phase connecting portion 53V for connecting the end portions of the second crossover portions 44 contiguous to the respective 96th element conductors 31, 31 of the first coil 21V1 and the second coil 21V2 of V phase, the W-phase connecting portion 53W connecting the end portions of the second crossover portions 44 contiguous to the respective 96th element conductors 31, 31 of the first coil 21W1 and the second coil 21W2 of W phase.

In FIG. 8, for convenience of illustration, the respective second crossover portions 44 contiguous to the 96th element conductors 31 are illustrated by a dashed line with displacement from the actual position in the radial direction of the stator 11. The second crossover portions 44 are actually arranged in the position of the same layer (the 8th layer as the outermost layer) as the layer of the 96th element conductors 31 in the radial direction of the stator 11.

The neutral point forming conductor 53 is formed such that portion 53a and portion 53b project (protrude) outward of the phase connecting portions 53U, 53V, 53W in the radial direction of the stator 11, the portion 53a being between the U-phase connecting portion 53U and the V-phase connecting portion 53V adjacent in the circumferential direction of the stator 11, the portion 53b being between the V-phase connecting portion 53V and the W-phase connecting portion 53W adjacent in the circumferential direction of the stator 11. The portions 53a, 53b extend in the circumferential direction of the stator 11.

As illustrated in FIG. 8, the U-phase connecting portion 53U, the V-phase connecting portion 53V, and the W-phase connecting portion 53W of the neutral point forming conductor 53 formed in this manner are respectively connected by welding from radially outer side to the end portions of the second crossover portions 44, 44 contiguous to the respective 96th element conductors 31, 31 of the first coil 21X1 and the second coil 21X2 for a corresponding phase, on the second end side in the axial direction of the stator 11.

In this manner, the element conductors 31 (the 96th element conductor 31) on one end side of each of the first coil 21X1 and the second coil 21X2 of any phase of U phase, V phase, and W phase are connected to the neutral point forming conductor 53 as the neutral point 22 in common with the three phases, on the second end side in the axial direction of the stator 11.

Next, in the present embodiment, the element conductor 31 connected to the current I/O terminal 23X of each phase is the 1st element conductor 31 in any of the first coil 21X1 and the second coil 21X2 of each phase.

In the present embodiment, as illustrated in FIGS. 8 and 11, a conductor terminal member 54X (54U, 54V, 54W) connected to the current I/O terminal 23X (23U, 23V, 23W) for each phase via a connecting cord 55X (55U, 55V, 55W) is connected by welding from radially outer side to the end portions of the second crossover portions 44, 44 contiguous to the respective 1st element conductors 31, 31 of the first coil 21X1 and the second coil 21X2 of a corresponding phase, on the second end side in the axial direction of the stator 11.

In this manner, the respective 1st element conductors 31, 31 of the first coil 21X1 and the second coil 21X2 for each phase are connected to the current I/O terminal 23X on the second end side in the axial direction of the stator 11.

In FIG. 8, for convenience of illustration, the respective second crossover portions 44 contiguous to the 1st element conductors 31 are illustrated with displacement from the actual position in the radial direction of the stator 11. The second crossover portions 44 are actually arranged in the position of the same layer (the 8th layer as the outermost layer) as the layer of the 1st element conductors 31 in the radial direction of the stator 11.

In this arrangement, even though the conductor terminal member 54U of U phase overlaps with the neutral point forming conductor 53 in the position in the circumferential direction of the stator 11 as illustrated in FIG. 8, the projection portion 53b (protruding portion in the radial direction) of the neutral point forming conductor 53 is formed so as to face the conductor terminal member 54U at the position of the conductor terminal member 54U. For this reason, the connecting cord 55U between the conductor terminal member 54U and the current I/O terminal 23U can be easily wired.

It should be noted that in the present embodiment, the end portion (which corresponds to the end of Cth element conductor in the present disclosure) of the second crossover portion 44 contiguous to the 1st element conductor 31, and the end portion (which corresponds to the end of Dth element conductor in the present disclosure) of the second crossover portion 44 contiguous to the 96th element conductor 31 have the same height (the height from the end face of the second end side in the axial direction of the stator 11) in the axial direction of the stator 11 as the height of the second crossover portions 44 contiguous to other element conductors 31 except the 48th and 49th element conductors 31, 31.

Therefore, the end portions of the second crossover portions 44 contiguous to the 48th and 49th element conductors 31 which are to be connected via the bridge conductor 51X, 52X have a height (the height from the end face of the second end side of the stator 11) in the axial direction higher than the end portions of the second crossover portion 44 contiguous to the 1st element conductor 31 and the end portions of the second crossover portion 44 contiguous to the 6th element conductor 31 by the thickness of the bridge conductors 51X, 52X in the axial direction of the stator 11.

For this reason, even when the bridge conductors 51X, 52X of each phase are connected to the end portions of the second crossover portions 44 contiguous to the 48th and 49th element conductors 31 after the connecting cord 55X of each phase is connected to the end portion of the second crossover portion 44 contiguous to the 1st element conductor 31 and the neutral point forming conductor 53 is connected to the end portion of the second crossover portion 44 contiguous to the 96th element conductor 31 of each phase, it is possible to avoid interference of the neutral point forming conductor 53 and the conductor terminal member 54 of the connecting cord 55X with the connection work for the bridge conductors 51X, 52X.

In the present embodiment, the second crossover portions 44, 44 contiguous to the respective 96th element conductors 31, 31 of the first coil 21X1 and the second coil 21X2 of each phase are bent in the negative circumferential direction. The negative circumferential direction is opposite to the positive circumferential direction which is the bending direction of the second crossover portions 44, 44 which are respectively connected to the bridge conductors 51X, 52X.

Therefore, as illustrated in FIG. 8, the end portions of the second crossover portions 44, 44 contiguous to the respective 96th element conductors 31, 31 of the first coil 21X1 and the second coil 21X2 of each phase are opposed, in the radial direction of the stator 11, to the end portions of the second crossover portions 44, 44 contiguous to the respective 49th element conductors 31, 31 of the first coil 21X1 and the second coil 21X2 of each phase.

Furthermore, in the present embodiment, the second crossover portions 44, 44 contiguous to the respective 1st element conductors 31, 31 of the first coil 21X1 and the second coil 21X2 of each phase are also bent in the negative circumferential direction (opposite to the positive circumferential direction which is the bending direction of the second crossover portions 44, 44 which are respectively connected to the bridge conductors 51X, 52X).

Therefore, as illustrated in FIG. 8, the end portions of the second crossover portions 44, 44 contiguous to the respective 1st element conductors 31, 31 of the first coil 21X1 and the second coil 21X2 of each phase are opposed, in the radial direction of the stator 11, to the end portions of the second crossover portions 44, 44 contiguous to the respective 48th element conductors 31, 31 of the first coil 21X1 and the second coil 21X2 of each phase.

The end portions of the second crossover portions 44, 44 respectively contiguous to the 48th and 49th element conductors 31, 31 to be connected via the bridge conductors 51X, 52X, the end portion of the second crossover portions 44 contiguous to the 1st element conductor 31 to be connected to the connecting cord 55X, and the end portion of the second crossover portion 44 contiguous to the 96th element conductor 31 to be connected to the neutral point forming conductor 53 are arranged as described above, and thus the bridge conductors 51X, 52X, the conductor terminal member 54 of the connecting cord 55X, and the neutral point forming conductor 53 of each phase can be densely arranged within a relatively narrow range in the circumferential direction of the stator 11.

For this reason, the bridge conductors 51X, 52X, the conductor terminal member 54 of the connecting cord 55X, and the neutral point forming conductor 53 can be efficiently connected to the second crossover portions 44 contiguous to respective corresponding element conductors 31.

What is described above is the structure of the coil 21 which is mounted on the stator 11 in the rotary electric machine according to the present embodiment.

According to the present embodiment, a pair of the first element conductor 31 and the second element conductor 31 to be connected via the first crossover portion 43 on the first end side in the axial direction of the stator 11 are inserted in the slots 12, 12 having 5 slot pitch (the second predetermined interval) in the circumferential direction of the stator 11.

Also, a pair of two first element conductors 31 and a pair of two second element conductors 31 to be connected via the second crossover portion 44 on the second end side in the axial direction of the stator 11 are inserted in the slots 12, 12 having 6 slot pitch (the first predetermined interval) in the circumferential direction of the stator 11.

Therefore, the first predetermined interval, which defines the length of the second crossover portion 44 in the circumferential direction of the stator 11, is an interval obtained by multiplying the unit pitch of the slot 12 by the number N (=6) of slots per pole, whereas the second predetermined interval, which defines the length of the first crossover portion 43 in the circumferential direction of the stator 11, is an interval (5 slot pitch) smaller than N×the unit pitch (6 slot pitch).

Thus, in the present embodiment, the total of the first predetermined interval and the second predetermined interval is smaller than twice the length of N×the pitch unit (6 slot pitch). Consequently, in the rotary electric machine in the present embodiment, the total of the maximum height of the first crossover portion 43 and the maximum height of the second crossover portion 44 in the axial direction of the stator 11 can be reduced compared with the above-described conventional rotary electric machine.

As a consequence, the rotary electric machine in the axial direction can be reduced in length and miniaturization thereof can be achieved.

Furthermore, according to the present embodiment, the first predetermined interval and the second predetermined interval are set as described above, and the element conductors 31 including coils of two phases out of U phase, V phase, and W phase are thereby arranged in each of the slots 12 aligned with 2 slot pitch in the circumferential direction of the stator 11 for each of the first coil 21X1 and the second coil 21X2.

Specifically, in FIGS. 3 and 4, the element conductors 13 only including coils of one phase are arranged in each slot 12 with an odd slot number, whereas the element conductors 13 including coils of two phases are arranged in each slot 12 with an even slot number.

In addition, in the present embodiment, the second predetermined interval is an interval of (N−1)×the unit pitch (5 slot pitch) which is smaller than N×the unit pitch (6 slot pitch) by 1 slot pitch.

Thus, the magnetic flux, which is generated by sequentially energizing respective coils 21U, 21V, 21W of U phase, V phase, W phase, has smooth variation in time and smooth distribution in the circumferential direction of the stator 11.

Consequently, variation in torque, which is generated in the rotor of the rotary electric machine, can be inhibited and noise due to the variation in torque can be reduced.

Although the second predetermined interval is set to an interval which is smaller than the first predetermined interval by 1 slot pitch in the embodiment described above, the second predetermined interval may be set to an interval which is smaller than the first predetermined interval by 2 slot pitch or more (for example, 4 slot pitch or 3 slot pitch).

Although the coil 21X (21U, 21V, 21W) of each phase is formed by the first coil 21X1 and the second coil 21X2 connected in parallel in the above embodiment, the coil 21X of each phase may be formed by only one of the first coil 21X1 and the second coil 21X2.

In the above embodiment, coils 21X (21U, 21V, 21W) of three phases are mounted on the stator 11, however, coils of only one phase or coils of only two phases may be mounted.

In the above embodiment, the first coil 21X1 and the second coil 21X2 of each phase are formed by connecting 4 sets of partial coils in series: the 1st to 24th partial coils, the 25th to 48th partial coils, the 49th to 72nd partial coils, and the 73rd to 96th partial coils. However, the coils of each phase may be formed by only one of 4 sets of partial coils or by connecting 2 sets out of the 4 sets of partial coils in series.

Although the segment conductor 40, which is a bundle of four bifurcated conductor members 41, is used in the above embodiment, individual bifurcated conductor members 41 may be separated from each other.

Also, a pair of the first element conductor 31 and the second element conductor 31 to be connected may be connected via a separate first crossover portion without using any bifurcated conductor member 41, or a pair of the first element conductors 31 to be connected and a pair of the second element conductors 31 to be connected may be connected via a separate second crossover portion.

In the above embodiment, the end portions of the second crossover portions 44 contiguous to the 48th and 49th element conductors 31 which are to be connected via the bridge conductor 51X, 52X have a height in the axial direction of the stator 11 higher than the end portions of the second crossover portion 44 contiguous to the 1st element conductor 31 and the end portions of the second crossover portion 44 contiguous to the 6th element conductor 31.

However, it is also possible to arrange the end portions of the second crossover portion 44 contiguous to the 1st element conductor 31 and the end portions of the second crossover portion 44 contiguous to the 6th element conductor 31 to be higher in the axial direction of the stator 11 than the end portions of the second crossover portions 44 contiguous to the 48th and 49th element conductors 31 which are to be connected via the bridge conductor 51X, 52X.

A rotary electric machine according to the present disclosure includes a three-phase coil consisting of a first phase coil, a second phase coil, and a third phase coil for magnetic flux generation, each coil in the three-phase coil is formed by connecting a plurality of element conductors in series, the element conductors being inserted in slots and extending in an axial direction of a stator, the slots being formed in the stator and arranged in a circumferential direction of the stator, and a bridge conductor is arranged on one end side of the stator in the axial direction for each phase, the bridge conductor connecting ends of specific Ath element conductor and Bth element conductor out of the element conductors that form each coil in the three-phase coil, the ends being on the one end side of the stator in the axial direction. An ath end and a bth end of each of the first phase, second phase, and third phase coils are arranged in the circumferential direction of the stator in an order, the ath end and the bth end being defined as the ends of the Ath element conductor and the Bth element conductor, respectively, of each coil in the three-phase coil on the one end side of the stator in the axial direction, the order being of the ath end of the first phase coil, the ath end of the second phase coil, the bth end of the first phase coil, the ath end of the third phase coil, the bth end of the second phase coil, and the bth end of the third phase coil, a bridge conductor connecting the ath end and the bth end of the first phase coil, and a bridge conductor connecting the ath end and the bth end of the third phase coil are formed in a protruding shape on one side of the stator in a radial direction when viewed in the axial direction of the stator, a bridge conductor connecting the ath end and the bth end of the second phase coil is formed in a protruding shape on the other side of the stator in the radial direction when viewed in the axial direction of the stator, and the bridge conductor of each coil in the three-phase coil is arranged at the same height position in the axial direction of the stator (a first aspect of the present disclosure).

According to the first aspect of the disclosure, the respective bridge conductors of three phase coils can be arranged so as not to overlap in the axial direction of the stator on one end side in the axial direction of the stator. For this reason, the bridge conductor of each phase can be arranged at a height position which is closer to the stator as much as possible in the axial direction of the stator.

In addition, the bridge conductor of the second phase coil and the bridge conductors of the first phase and third phase coils are formed in a protruding shape in opposite directions in the radial direction of the stator, and thus the bridge conductors of the three phase coils can have a reduced width in the radial direction of the stator and can be densely arranged at locations closer to each other.

Therefore, even when the interval between the inner circumferential surface and the outer circumferential surface of the stator is relatively small, the bridge conductor of any phase is prevented from inwardly extending off the inner circumferential surface of the stator.

Consequently, according to the first disclosure, it is possible to implement bridge conductors having a suitable configuration to achieve miniaturization of the rotary electric machine.

In the first aspect of the disclosure, it is preferable that the ath end and the bth end of each coil in the three-phase coil are formed to be protruding in the axial direction of the stator from ends of other element conductors except the Ath element conductor and the Bth element conductor by a thickness of the bridge conductor in the axial direction of the stator on the one end side of the stator in the axial direction, and the bridge conductor of each coil in the three-phase coil is arranged at a position at the same height as a height of the ath end and the bth end in the axial direction of the stator (a second aspect of the present disclosure).

It should be noted that "thickness of the bridge conductor" includes the thickness of an insulating member (such as insulating coating) provided surrounding the bridge conductor.

According to the second aspect of the present disclosure, the bridge conductor of each phase can be arranged with a minimum necessary height in the axial direction of the stator. Consequently, miniaturization of the rotary electric machine can be effectively achieved. Because the ath end and the bth end of each phase coil are protruding in the axial direction of the stator from the ends of other element conductors except the Ath element conductor and the Bth element conductor, connection of the bridge conductor to the ath end and the bth end can be easily made.

In the second aspect of the disclosure, it is preferable that element conductors are inserted as layers in each of the slots in the radial direction of the stator, in slots in which the Ath element conductor and the Bth element conductor of each coil in the three-phase coil are inserted, the Ath element conductor and the Bth element conductor are each arranged in a middle layer between an outermost layer and an innermost layer in the radial direction of the stator, and the bridge conductor of each coil in the three-phase coil is arranged within a range between an inner circumferential surface and an outer circumferential surface of the stator when viewed in the axial direction of the stator (a third aspect of the present disclosure).

According to the third aspect of the present disclosure, in the slots in which the respective Ath element conductors and Bth element conductors of the three phase coils are inserted, the Ath element conductors and the Bth element conductors are each arranged in a middle layer between the outermost layer and the innermost layer in the radial direction of the stator.

Therefore, the dimension between the inner circumferential surface and the outer circumferential surface of the stator can be kept at a minimum necessary dimension which allows necessary number of element conductors for each slot to be inserted as layers, and the respective bridge conductors of the three phase coils can be arranged within the range between the inner circumferential surface and the outer circumferential surface of the stator when viewed in the axial direction of the stator.

Consequently, the size of the stator can be kept at a reduced dimension and the bridge conductors can be prevented from projecting inwardly of the stator.

In the rotary electric machine according to the first to third aspects of the disclosure, the three-phase coil may include one three-phase coil and the other three-phase coil, the one three-phase coil including a first coil of the first phase, a first coil of the second phase, and a first coil of the third phase, the other three-phase coil including a second coil of the first phase, a second coil of the second phase, and a second coil of the third phase.

In this configuration, it is preferable that the ath end and the bth end of each coil in the two three-phase coils are arranged in the circumferential direction of the stator in an order of a pair of the ath ends of the first coil of the first phase and the second coil of the first phase, a pair of the ath ends of the first coil of the second phase and the second coil of the second phase, a pair of the bth ends of the first coil of the first phase and the second coil of the first phase, a pair of the ath ends of the first coil of the third phase and the second coil of the third phase, a pair of the bth ends of the first coil of the second phase and the second coil of the second phase, and a pair of the bth ends of the first coil of the third phase and the second coil of the third phase, the ath end and the bth end of the first coil of each phase, and the ath end and the bth end of the second coil of the phase are arranged in the circumferential direction of the stator such that an interval between the ath end and the bth end of the second coil of the phase is larger than an interval between the ath end and the bth end of the first coil of the phase, and the bridge conductor of the first coil of each phase is formed to be located inner side of the bridge conductor of the second coil of the phase (a fourth aspect of the present disclosure).

According to the fourth aspect of the present disclosure, all the bridge conductors of each coil in two three-phase coils can be arranged at locations closer to each other so as not to overlap in the axial direction of the stator and at the same height position in the axial direction of the stator. Furthermore, the bridge conductor of each phase first coil is located inner side of the bridge conductor of the phase second coil, and thus the bridge conductors in two three-phase coils do not present a complicated geometry but present a simple geometry.

In the first to fourth aspects of the present disclosure, it is preferable that for the bridge conductor of each coil in the three-phase coil, a portion of the bridge conductor between the ath end and the bth end to be connected by the bridge conductor is formed in a rectangular shape that extends in the circumferential direction of the stator (a fifth aspect of the present disclosure).

According to the fifth aspect of the present disclosure, each bridge conductor can be easily produced. Also, each bridge conductor can be easily held by a robot hand or the like, which facilitates the work of connecting the bridge conductor to the ath end and the bth end.

In the first to fifth aspects of the present disclosure, it is preferable that each of the three-phase coil includes a plurality of element conductor pairs, each of the element conductor pairs being a pair of two element conductors which are inserted in two slots having respective predetermined intervals in the circumferential direction and the radial direction of the stator, the pair of element conductors being adjacent in an order of connection in the phase coil, each element conductor pair in each of the three phase coil is integrally formed as a bifurcated conductor member which is a conductor member in a bifurcated conductor shape, the bifurcated conductor member including two legs and leg connection portions, the legs being inserted in the two slots from the other end side in the axial direction of the stator and forming the two element conductors in the element conductor pair, the leg connection portions connecting one ends of the two legs and partially constituting a first crossover portion, the first crossover portion connecting the two element conductors in the element conductor pair on the other end side of the stator in the axial direction, when a first element conductor pair and a second element conductor pair are defined as two element conductor pairs each having one of element conductors which are adjacent in the order of connection in the phase coil and different from the Ath element conductor and the Bth element conductor, the two element conductor pairs being of the element conductor pairs in each of the three phase coil, one element conductor in the first element conductor pair and the other element conductor in the second element conductor pair, the other element conductor being adjacent to the one element conductor in the order of connection are connected via a second crossover portion on the one end side of the stator in the axial direction, the second crossover portion being configured to serve as a member that connects an end portion of a leg of a bifurcated conductor member included in the first element conductor pair, and an end portion of a leg of a bifurcated conductor member included in the second element conductor pair, the end portions being bent to be closer to each other in the circumferential direction of the stator on the one end side of the stator in the axial direction, and respective ends of the Ath element conductor and the Bth element conductor on the one end side of the stator in the axial direction are formed as end portions of legs included in a bifurcated conductor member, the legs forming each of the Ath element conductor and the Bth element conductor, the end portions being bent in the circumferential direction of the stator on the one end side of the stator in the axial direction (a sixth aspect of the present disclosure).

According to the sixth aspect of the present disclosure, the insertion of the two legs of the bifurcated conductor member allows the element conductor pair formed by the legs to be connected via the first crossover portion on the other end side of the stator in the axial direction, and thus work of connection of the element conductor pair on the other end side in the axial direction is not necessary.

On the one end side of the stator in the axial direction, except for the connection between the Ath element conductor and the Bth element conductor, the end portion of a leg of the bifurcated conductor member included in the first element conductor pair and the end portion of a leg of the bifurcated conductor member included in the second element conductor pair are connected to each other on the one end side of the stator in the axial direction, the end portions being bent to be closer to each other in the circumferential direction of the stator, thereby connecting one element conductor in the first element conductor pair and the other element conductor in the second element conductor pair, the other element conductor being adjacent to the one element conductor in the order of connection. Consequently, the connection can be easily made and the second crossover portion formed by the connection can be closer to one end of the stator in the axial direction.

In addition, the respective ends of the Ath element conductor and the Bth element conductor to be connected by the bridge conductor are formed as the ends of legs with the end portions of the two legs bent, the two legs forming the Ath element conductor and the Bth element conductor.

Consequently, the structure can be easily implemented in which the bridge conductor connecting the ends of the Ath element conductor and the Bth element conductor is arranged to be close to one end of the stator in the axial direction.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine comprising a three-phase coil having a first phase coil, a second phase coil, and a third phase coil for magnetic flux generation, each coil in the three-phase coil is formed by connecting a plurality of element conductors in series, the element conductors being inserted in slots and extending in an axial direction of a stator, the slots being formed in the stator and arranged in a circumferential direction of the stator, and a bridge conductor is arranged on one end side of the stator in the axial direction for each phase, the bridge conductor connecting ends of specific Ath element conductor and Bth element conductor out of the element conductors that form each coil in the three-phase coil, the ends being on the one end side of the stator in the axial direction, wherein an ath end and a bth end of each of the first phase, second phase, and third phase coils are arranged in the circumferential direction of the stator in an order, the ath end and the bth end being defined as the ends of the Ath element conductor and the Bth element conductor, respectively, of each coil in the three-phase coil on the one end side of the stator in the axial direction, the order being of the ath end of the first phase coil, the ath end of the second phase coil, the bth end of the first phase coil, the ath end of the third phase coil, the bth end of the second phase coil, and the bth end of the third phase coil, the bridge conductor connecting the ath end and the bth end of the first phase coil, and the bridge conductor connecting the ath end and the bth end of the third phase coil are formed in a protruding shape on one side of the stator in a radial direction when viewed in the axial direction of the stator, the bridge conductor connecting the ath end and the bth end of the second phase coil is formed in a protruding shape on the other side of the stator in the radial direction when viewed in the axial direction of the stator, and the bridge conductor of each coil in the three-phase coil is arranged at the same height position in the axial direction of the stator such that the bridge conductors do not overlap in the axial direction when viewed in the axial direction of the stator.

2. The rotary electric machine according to claim 1, wherein the ath end and the bth end of each coil in the three-phase coil are formed to be protruding in the axial direction of the stator from ends of other element conductors except the Ath element conductor and the Bth element conductor by a thickness of the bridge conductor in the axial direction of the stator on the one end side of the stator in the axial direction, and the bridge conductor of each coil in the three-phase coil is arranged at a position at the same height as a height of the ath end and the bth end in the axial direction of the stator.

3. The rotary electric machine according to claim 2, wherein element conductors are inserted as layers in each of the slots in the radial direction of the stator, in slots in which the Ath element conductor and the Bth element conductor of each coil in the three-phase coil are inserted, the Ath element conductor and the Bth element conductor are each arranged in a middle layer between an outermost layer and an innermost layer in the radial direction of the stator, and the bridge conductor of each coil in the three-phase coil is arranged within a range between an inner circumferential surface and an outer circumferential surface of the stator when viewed in the axial direction of the stator.

4. The rotary electric machine according to claim 1, wherein the three-phase coil includes one three-phase coil and the other three-phase coil, the one three-phase coil including a first coil of the first phase, a first coil of the second phase, and a first coil of the third phase, the other three-phase coil including a second coil of the first phase, a second coil of the second phase, and a second coil of the third phase, the ath end and the bth end of each coil in the two three-phase coils are arranged in the circumferential direction of the stator in an order of a pair of the ath ends of the first coil of the first phase and the second coil of the first phase, a pair of the ath ends of the first coil of the second phase and the second coil of the second phase, a pair of the bth ends of the first coil of the first phase and the second coil of the first phase, a pair of the ath ends of the first coil of the third phase and the second coil of the third phase, a pair of the bth ends of the first coil of the second phase and the second coil of the second phase, and a pair of the bth ends of the first coil of the third phase and the second coil of the third phase, the ath end and the bth end of the first coil of each phase, and the ath end and the bth end of the second coil of the phase are arranged in the circumferential direction of the stator such that an interval between the ath end and the bth end of the second coil of the phase is larger than an interval between the ath end and the bth end of the first coil of the phase, and the bridge conductor of the first coil of each phase is formed to be located at an inner side of a respective bridge conductor of the second coil of the phase.

5. The rotary electric machine according to claim 1, wherein for the bridge conductor of each coil in the three-phase coil, a portion of the bridge conductor between the ath end and the bth end to be connected by the bridge conductor is formed in a rectangular shape that extends in the circumferential direction of the stator.

6. The rotary electric machine according to claim 1, wherein each of the three-phase coil includes a plurality of element conductor pairs, each of the element conductor pairs being a pair of two element conductors which are inserted in two slots having respective predetermined intervals in the circumferential direction and the radial direction of the stator, the pair of element conductors being adjacent in an order of connection in the phase coil, each element conductor pair in each of the three phase coil is integrally formed as a bifurcated conductor member which is a conductor member in a bifurcated conductor shape, the bifurcated conductor member including two legs and leg connection portions, the legs being inserted in the two slots from the other end side in the axial direction of the stator and forming the two element conductors in the element conductor pair, the leg connection portions connecting one ends of the two legs and partially constituting a first crossover portion, the first crossover portion connecting the two element conductors in the element conductor pair on the other end side of the stator in the axial direction, when a first element conductor pair and a second element conductor pair are defined as two element conductor pairs each having one of element conductors which are adjacent in the order of connection in the phase coil and different from the Ath element conductor and the Bth element conductor, the two element conductor pairs being of the element conductor pairs in each of the three phase coil, one element conductor in the first element conductor pair and the other element conductor in the second element conductor pair, the other element conductor being adjacent to the one element conductor in the order of connection are connected via a second crossover portion on the one end side of the stator in the axial direction, the second crossover portion being configured to serve as a member that connects an end portion of a leg of a bifurcated conductor member included in the first element conductor pair, and an end portion of a leg of a bifurcated conductor member included in the second element conductor pair, the end portions being bent to be closer to each other in the circumferential direction of the stator on the one end side of the stator in the axial direction, and respective ends of the Ath element conductor and the Bth element conductor on the one end side of the stator in the axial direction are formed as end portions of legs included in a bifurcated conductor member, the legs forming each of the Ath element conductor and the Bth element conductor, the end portions being bent in the circumferential direction of the stator on the one end side of the stator in the axial direction.

7. A rotary electric machine comprising a stator arranged around a rotor,
a three-phase coil including a first phase coil, a second phase coil, and a third phase coil for magnetic flux generation, each coil in the three-phase coil includes a plurality of element conductors connected in series, the plurality of element conductors being inserted into slots and extending in an axial direction of the stator, the slots being provided in the stator and arranged in a circumferential direction of the stator, and a bridge conductor is arranged on one end side of the stator in the axial direction for each phase, the bridge conductor connecting ends of specific Ath element conductor and Bth element conductor out of the element conductors that provide each coil in the three-phase coil, the ends being on the one end side of the stator in the axial direction, wherein an ath end and a bth end of each of the first phase, second phase, and third phase coils are arranged in the circumferential direction of the stator in an order, the ath end and the bth end being defined as the ends of the Ath element conductor and the Bth element conductor, respectively, of each coil in the three-phase coil on the one end side of the stator in the axial direction, the order being of the ath end of the first phase coil, the ath end of the second phase coil, the bth end of the first phase coil, the ath end of the third phase coil, the bth end of the second phase coil, and the bth end of the third phase coil, the bridge conductor connecting the ath end and the bth end of the first phase coil, and the bridge conductor connecting the ath end and the bth end of the third phase coil are provided in a protruding shape on one side of the stator in the radial direction when viewed in the axial direction of the stator, the bridge conductor connecting the ath end and the bth end of the second phase coil is provided in a protruding shape on the other side of the stator in the radial direction when viewed in the axial direction of the stator, and the bridge conductor of each coil in the three-phase coil is arranged at the same height position in the axial direction of the stator such that the bridge conductors do not overlap in the axial direction when viewed in the axial direction of the stator.

8. The rotary electric machine according to claim 7, wherein the ath end and the bth end of each coil in the three-phase coil are provided to be protruding in the axial direction of the stator from ends of other element conductors except the Ath element conductor and the Bth element conductor by a thickness of the bridge conductor in the axial direction of the stator on the one end side of the stator in the axial direction, and the bridge conductor of each coil in the three-phase coil is arranged at a position at the same height as a height of the ath end and the bth end in the axial direction of the stator.

9. The rotary electric machine according to claim 8, wherein element conductors are inserted as layers into each of the slots in the radial direction of the stator,
in slots into which the Ath element conductor and the Bth element conductor of each coil in the three-phase coil are inserted, the Ath element conductor and the Bth element conductor are each arranged in a middle layer between an outermost layer and an innermost layer in the radial direction of the stator, and
the bridge conductor of each coil in the three-phase coil is arranged within a range between an inner circumferential surface and an outer circumferential surface of the stator when viewed in the axial direction of the stator.

10. The rotary electric machine according to claim 7, wherein the three-phase coil includes one three-phase coil and the other three-phase coil, the one three-phase coil including a first coil of the first phase, a first coil of the second phase, and a first coil of the third phase, the other three-phase coil including a second coil of the first phase, a second coil of the second phase, and a second coil of the third phase,
the ath end and the bth end of each coil in the two three-phase coils are arranged in the circumferential direction of the stator in an order of a pair of the ath ends of the first coil of the first phase and the second coil of the first phase, a pair of the ath ends of the first coil of the second phase and the second coil of the second phase, a pair of the bth ends of the first coil of the first phase and the second coil of the first phase, a pair of the ath ends of the first coil of the third phase and the second coil of the third phase, a pair of the bth ends of the first coil of the second phase and the second coil of the second phase, and a pair of the bth ends of the first coil of the third phase and the second coil of the third phase,
the ath end and the bth end of the first coil of each phase, and the ath end and the bth end of the second coil of the phase are arranged in the circumferential direction of the stator such that an interval between the ath end and the bth end of the second coil of the phase is larger than an interval between the ath end and the bth end of the first coil of the phase, and
the bridge conductor of the first coil of each phase is provided to be located at an inner side of a respective bridge conductor of the second coil of the phase.

11. The rotary electric machine according to claim 7, wherein for the bridge conductor of each coil in the three-phase coil, a portion of the bridge conductor between the ath end and the bth end to be connected by the bridge conductor is provided in a rectangular shape that extends in the circumferential direction of the stator.

12. The rotary electric machine according to claim 7, wherein each of the three-phase coil includes a plurality of element conductor pairs, each of the element conductor pairs being a pair of two element conductors which are inserted into two slots having respective predetermined intervals in the circumferential direction and the radial direction of the stator, the pair of element conductors being adjacent in an order of connection in the phase coil,
each element conductor pair in each of the three phase coil is integrally provided as a bifurcated conductor member which is a conductor member in a bifurcated conductor shape, the bifurcated conductor member including two legs and leg connection portions, the legs being inserted into the two slots from the other end side in the axial direction of the stator and providing the two element conductors in the element conductor pair, the leg connection portions connecting one ends of the two legs and partially constituting a first crossover portion, the first crossover portion connecting the two element conductors in the element conductor pair on the other end side of the stator in the axial direction,
when a first element conductor pair and a second element conductor pair are defined as two element conductor pairs each having one of element conductors which are adjacent in the order of connection in the phase coil and different from the Ath element conductor and the Bth element conductor, the two element conductor pairs being of the element conductor pairs in each of the three phase coil, one element conductor in the first element conductor pair and the other element conductor in the second element conductor pair, the other element conductor being adjacent to the one element conductor in the order of connection are connected via a second crossover portion on the one end side of the stator in the axial direction, the second crossover portion being configured to serve as a member that connects an end portion of a leg of a bifurcated conductor member included in the first element conductor pair, and an end portion of a leg of a bifurcated conductor member included in the second element conductor pair, the end portions being bent to be closer to each other in the circumferential direction of the stator on the one end side of the stator in the axial direction, and
respective ends of the Ath element conductor and the Bth element conductor on the one end side of the stator in the axial direction are provided as end portions of legs included in a bifurcated conductor member, the legs providing each of the Ath element conductor and the Bth element conductor, the end portions being bent in the circumferential direction of the stator on the one end side of the stator in the axial direction.

13. The rotary electric machine according to claim 1, wherein an entirety of each bridge conductor is arranged at the same height position in the axial direction of the stator.

14. The rotary electric machine according to claim 7, wherein an entirety of each bridge conductor is arranged at the same height position in the axial direction of the stator.

* * * * *